United States Patent
Watanabe et al.

(10) Patent No.: US 11,693,638 B2
(45) Date of Patent: Jul. 4, 2023

(54) COMPILER PROGRAM, COMPILING METHOD, INFORMATION PROCESSING DEVICE

(71) Applicant: FUJITSU LIMITED, Kawasaki (JP)

(72) Inventors: Kensuke Watanabe, Numazu (JP); Masatoshi Haraguchi, Fuji (JP); Shun Kamatsuka, Numazu (JP); Yasunobu Tanimura, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 318 days.

(21) Appl. No.: 17/203,800

(22) Filed: Mar. 17, 2021

(65) Prior Publication Data
US 2021/0382700 A1    Dec. 9, 2021

(30) Foreign Application Priority Data
Jun. 9, 2020    (JP) ................................. 2020-100151

(51) Int. Cl.
G06F 9/30        (2018.01)
G06F 9/06        (2006.01)
(Continued)

(52) U.S. Cl.
CPC .......... G06F 8/443 (2013.01); G06F 9/30036 (2013.01); G06F 9/30098 (2013.01);
(Continued)

(58) Field of Classification Search
CPC ...... G06F 8/443; G06F 8/452; G06F 9/30036; G06F 9/30098; G06F 9/3836; G06F 9/30043
See application file for complete search history.

(56) References Cited

U.S. PATENT DOCUMENTS 6,539,541 B1 * 3/2003 Geva ....................... G06F 8/443
                                                                717/160
2016/0328236 A1   11/2016 Kamatsuka
(Continued)

FOREIGN PATENT DOCUMENTS

JP        H09-160784 A     6/1997
JP        2016-212573 A    12/2016

OTHER PUBLICATIONS

Andreas Krall et al., Compilation Techniques for Multimedia Processors, 2000, [Retrieved on Mar. 15, 2023], Retrieved from the internet: <URL: https://link.springer.com/content/pdf/10.1023/A:1007507005174.pdf> 15 Pages (347-361) (Year: 2000).*

(Continued)

*Primary Examiner* — Anibal Rivera
(74) *Attorney, Agent, or Firm* — Fujitsu Patent Center

(57) ABSTRACT

A compiler program causes a computer to execute optimization processing for an optimization target program. The optimization target program includes a loop including a vector store instruction and a vector load instruction for an array variable. The optimization processing includes (1) unrolling the vector store instruction and the vector load instruction in the loop by an unrolling number of times to generate a plurality of unrolled vector store instructions and a plurality of unrolled vector load instructions, and (2) scheduling to move an unrolled vector load instruction among the plurality of unrolled vector load instructions, which is located after a first unrolled vector store instruction that is located at first among the plurality of unrolled vector load instructions, before the first unrolled vector store instruction.

9 Claims, 30 Drawing Sheets

(51) Int. Cl.
  *G06F 8/41* (2018.01)
  *G06F 9/38* (2018.01)
(52) U.S. Cl.
  CPC ............ *G06F 9/3836* (2013.01); *G06F 8/452* (2013.01); *G06F 9/30043* (2013.01)

(56) References Cited

U.S. PATENT DOCUMENTS

2017/0168745 A1* 6/2017 Burlacu-Zane ......... G06F 8/433
2019/0005175 A1* 1/2019 Tian ...................... G06F 30/331

OTHER PUBLICATIONS

Rajkishore Barik et al., Efficient Selection of Vector Instructions using Dynamic Programming, 2010 IEEE, [Retrieved on Mar. 15, 2023]. Retrieved from the internet: <URL: https://ieeexplore.ieee.org/stamp/stamp.jsp?tp=&arnumber=5695537> 12 Pages (201-212) (Year: 2010).*

* cited by examiner

FIG. 7

C20 — SFI_2 IS AVOIDED BY UNPACKING VECTOR COMMAND

```
01  // SOURCE CODE
02  real(4)::a(9,32),b(9,32)
03  do i = 1,32
04    do j = 1,8 // VL:16
05      a(j,i) = a(j,i)+b(j,i)
06    enddo
07  enddo
```

VECTORIZATION ↑

C21
```
01  // VECTORIZED INTERMEDIATE PSEUDO CODE
02  real(4)::a(9,32),b(9,32)
03  do i = 1,32
04    a(1:8,i) = a(1:8,i)+b(1:8,i)
05  enddo
```

CONVERSION INTO ASSEMBLY CODE ↓ ps0
| MASK | T | T | T | T | T | T | T | T | F | F | F | F | F | F | F | F |

←—— TRUE ——→←——————— VL ———————→

C22
```
01  // ASSEMBLY PSEUDO CODE (ONLY PRIMARY INSTRUCTIONS ARE EXTRACTED)
02    predicate_true ps0,VL:8
03  .LOOP:
04    vload vs2,b(1:8,i),ps0    // vs2 = b(1:8,i)
05    vload vs1,a(1:8,i),ps0    // vs1 = a(1:8,i)         4-BYTE COMMAND
06    add vs1,vs1,vs2           // vs1 = vs1+vs2
07    vstore a(1:8,i),vs1,ps0   // a(1:8,i) = vs1
08    sub d2,d2,1
09    bne.LOOP
```

→ unpacked pd0
| MASK | T | T | T | T | T | T | T | T |

←——————— TRUE ———————→
←——————— VL ———————→

C23
```
01  // UNPACKED ASSEMBLY PSEUDO CODE (ONLY MAJOR INSTRUCTIONS ARE EXTRACTED)
02    predicate_true pd0,ALL // VL:8
03  .LOOP:
04    vload vd2,b(1:8,i),pd0    // = b(1:8,i)
05    vload vd1,a(1:8,i),pd0    // = a(1:8,i)             8-BYTE COMMAND
06    add vd1,vd1,vd2
07    vstore a(1:8,i),vd1,pd0   // a(1:8,i) =
08    sub d2,d2,1
09    bne.LOOP
```

FIG. 13

| VECTOR LENGTH VL | 16 | | | | | | | | | | | | | | | |
|---|---|---|---|---|---|---|---|---|---|---|---|---|---|---|---|---|
| LOOP ITERATION COUNT m | m =< n | | | | | | | | | | | | | | | |
| ARRAY SIZE n | 1 | 2 | 3 | 4 | 5 | 6 | 7 | 8 | 9 | 10 | 11 | 12 | 13 | 14 | 15 | 16 |
| Ceil(VL/n) | 16 | 8 | 6 | 4 | 4 | 3 | 3 | 2 | 2 | 2 | 2 | 2 | 2 | 2 | 2 | 1 |
| Ceil(VL/n)-1 | 15 | 7 | 5 | 3 | 3 | 2 | 2 | 1 | 1 | 1 | 1 | 1 | 1 | 1 | 1 | 0 |

FIG. 15
SFI_2 IS AVOIDED BY LOOP UNROLLING AND SCHEDULING (vstore→vload)
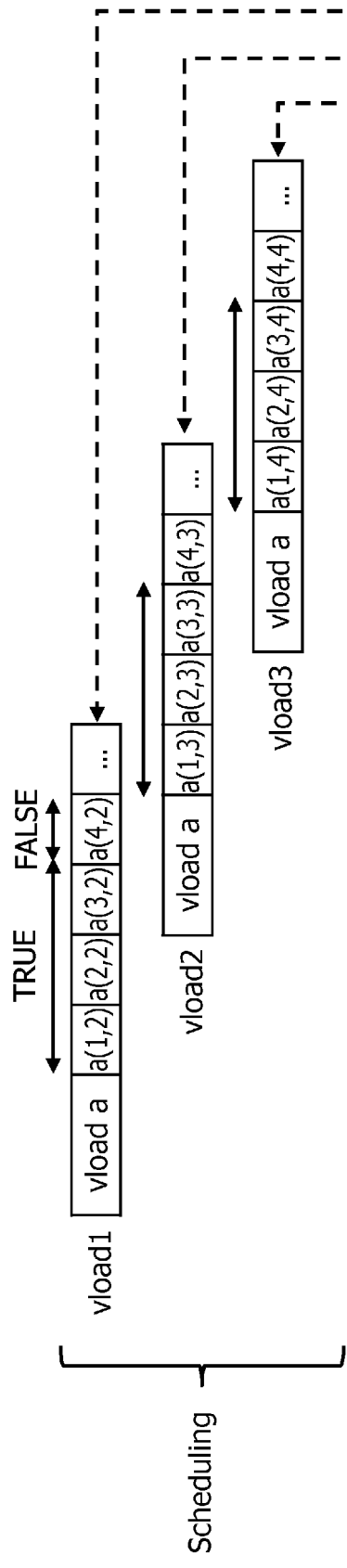
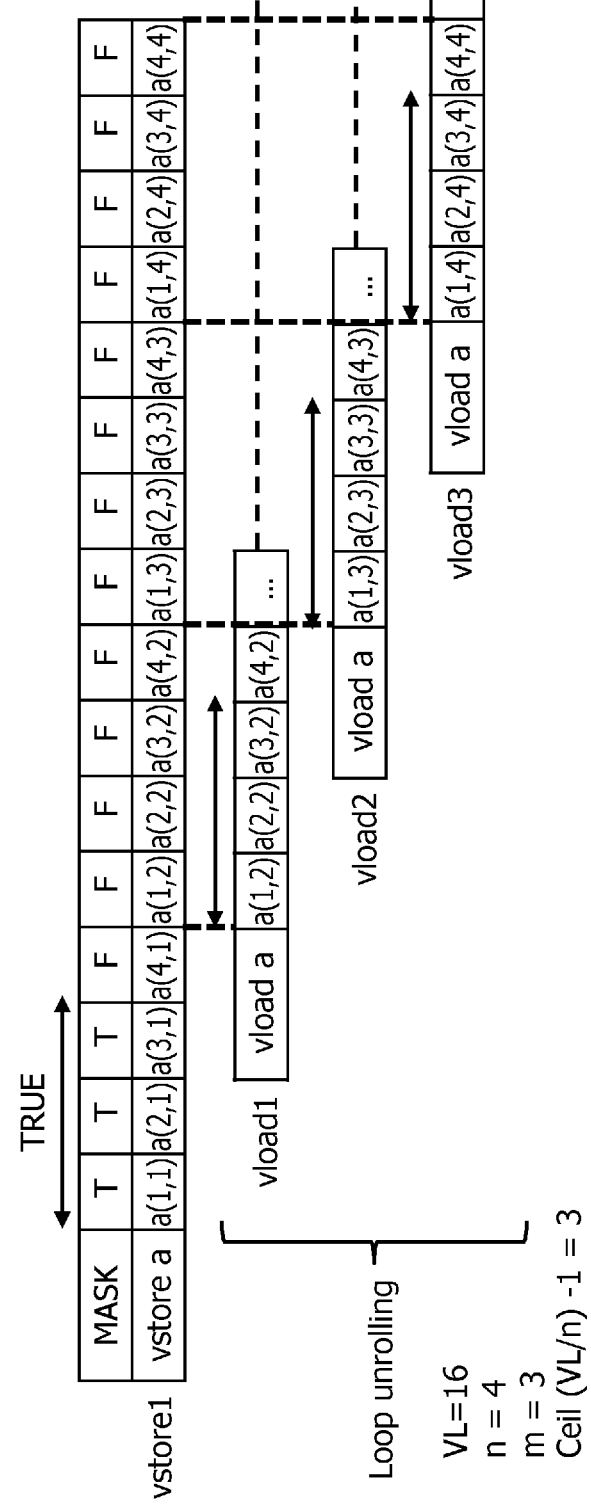

FIG. 18 vload→vstore IN LOOP

C40

```
01  [0] SOURCE CODE
02  real(4)::a(n,32), b(n,32)
03  do i= 1, 32
04    do j = 1, m   //VL: CONSTANT OR UNKNOWN
05      a(j,i) = a(j,i) + b(j,i)
06    enddo
07  enddo
```

C41

```
01  [1] INTERMEDIATE PSEUDO CODE AFTER VECTORIZATION
02  real(4)::a(n,32), b(n,32)
03  do i= 1, 32
04    do j = 1, m, VL   // VL: 16
05      a(j:j+VL-1,i) = a(j:j+VL-1,i) + b(j:j+VL-1,i)
06    enddo
07  enddo
```

[2] CREATION OF BRANCH STRUCTURE      vload→vstore IN LOOP

FIG. 19

C42
```
01  real(4)::a(n,32), b(n,32)
02  if (VL IS INCLUDED IN VL_array AND n <= VL)
03  select ( ceil(VL/n) ) {
04   case 0:
05   case 1: // PROCESSING IS SAME FOR 0 AND 1 (DOES NOT unroll)
06    do i = 1, 32
07     a(1:m,i) = a(1:m,i) + b(1:m,i)
08    enddo
09   case 2: // 2 unroll
10    do i = 1, 32
11     a(1:m,i) = a(1:m,i) + b(1:m,i)
12    enddo
13   case 3: // 3 unroll
14    do i = 1, 32
15     a(1:m,i) = a(1:m,i) + b(1:m,i)
16    enddo
17   case 4: // full unroll EXPAND EXECUTION STATEMENT BY ARRAY SIZE (n=4)
18    do i = 1, 32
19     a(1:m,i) = a(1:m,i) + b(1:m,i)
20    enddo
21   case 6: // full unroll EXPAND EXECUTION STATEMENT BY ARRAY SIZE (n=3)
22    do i = 1, 32
23     a(1:m,i) = a(1:m,i) + b(1:m,i)
24    enddo
25   case 8: // full unroll EXPAND EXECUTION STATEMENT BY ARRAY SIZE (n=2)
26    do i = 1, 32
27     a(1:m,i) = a(1:m,i) + b(1:m,i)
28    enddo
29   case 16: // SCALAR EXECUTION RETURN ORIGINAL LOOP STRUCTURE
30    do i = 1, 32
31     do j = 1, m
32      a(j,i) = a(j,i) + b(j,i)
33     enddo
34    enddo
35  else // n>VL AND VL THAT DOES NOT CAUSE SFI_2 (NOT INCLUDED
36   IN VL_array)
37    do i=1, 32
38     do j = 1, m, VL   //VL: 16
39      a(j:j+VL-1,i) = a(j:j+VL-1,i) + b(j:j+VL-1,i)
40     enddo
41    enddo
42  endif
```

FIG. 20

[3] UNROLLING         vload→vstore IN LOOP
                      ┌─C43

```
01  real(4)::a(n,32), b(n,32)
02  if (VL IS INCLUDED IN VL_array AND n <= VL)
03  select ( ceil(VL/n) ){
04  case 0:
05  case 1:  // PROCESSING IS SAME FOR 0 AND 1 (DOES NOT unroll)
06    do i= 1, 32
07      a(1:m,j) = a(1:m,j) + b(1:m,j)
08    enddo
09  case 2:  // 2 unroll
10    do i= 1, 32, 2
11      a(1:m,j) = a(1:m,j) + b(1:m,j)
12      a(1:m,j+1) = a(1:m,j+1) + b(1:m,j+1)
13    enddo
14  case 3:  // 3 unroll
15    do i= 1, 32, 3
16      a(1:m,j) = a(1:m,j) + b(1:m,j)
17      a(1:m,j+1) = a(1:m,j+1) + b(1:m,j+1)
18      a(1:m,j+2) = a(1:m,j+2) + b(1:m,j+2)
19    enddo
20  case 4:  // full unroll EXPAND EXECUTION STATEMENT BY ARRAY SIZE (n=4)
21    do i= 1, 32, 4
22      a(1:m,j) = a(1:m,j) + b(1:m,j)
23      a(1:m,j+1) = a(1:m,j+1) + b(1:m,j+1)
24      a(1:m,j+2) = a(1:m,j+2) + b(1:m,j+2)
25      a(1:m,j) = a(1:m,j) + b(1:m,j)
26    enddo
27  case 6:  // full unroll EXPAND EXECUTION STATEMENT BY ARRAY SIZE (n=3)
28    do i= 1, 32, 3
29      a(1:m,j) = a(1:m,j) + b(1:m,j)
30      a(1:m,j+1) = a(1:m,j+1) + b(1:m,j+1)
31      a(1:m,j+2) = a(1:m,j+2) + b(1:m,j+2)
32    enddo
33  case 8:  // full unroll EXPAND EXECUTION STATEMENT BY ARRAY SIZE (n=2)
34    do i= 1, 32, 2
35      a(1:m,j) = a(1:m,j) + b(1:m,j)
36      a(1:m,j+1) = a(1:m,j+1) + b(1:m,j+1)
37    enddo
38  case 16:  // SCALAR EXECUTION RETURN TO ORIGINAL LOOP STRUCTURE
39    do i= 1, 32
40      do j = 1, m
41        a(j,i) = a(j,i) + b(j,i)
42      enddo
43    enddo
44  else // n>VL AND VL THAT DOES NOT CAUSE SFI_2 (NOT INCLUDED
       IN VL_array)
45  }
46    do i=1, 32
47      do j = 1, m, VL    //VL: 16
48        a(j:j+VL-1,i) = a(j:j+VL-1,i) + b(j:j+VL-1,i)
49      enddo
50    enddo
51  endif
```

FIG. 21 vstore→vload IN LOOP

C50
```
01  [0] SOURCE PROGRAM DESCRIBED BY USER
02  real(4)::a(n,33), b(n,33), c(n,33)
03  do i= 1, 32
04    do j = 1, m   //VL: CONSTANT OR UNKNOWN
05      a(j,i) = b(j,i)
06      c(j,i) = a(j,i+1) + i
07    enddo
08  enddo
```

C51
```
01  [1] AFTER VECTORIZATION
02  real(4)::a(n,33), b(n,33), c(n,33)
03  do i= 1, 32
04    do j = 1, m, VL   // VL: 16
05      a(j:j+VL-1,i) = b(j:j+VL-1,i)
06      c(j:j+VL-1,i) = a(j:j+VL-1,i+1) + i
07    enddo
08  enddo
```

FIG. 22 vstore→vload IN LOOP

[2] CREATION OF BRANCH STRUCTURE ⎡C52

```
01  real(4)::a(n,33), b(n,33), c(n,33)
02  if (VL IS INCLUDED IN VL_array AND n <= VL)
03    select (ceil(VL/n)-1)
04    case 0;
05    case 1: // PROCESSING IS SAME FOR 0 AND 1 (DOES NOT unroll)
06      do i = 1, 32
07        a(1:m,j) = b(1:m,j)
08        c(1:m,j) = a(1:m,i+1) + i
09      enddo
10    case 2: // 2 unroll
11      do i = 1, 32
12        a(1:m,j) = b(1:m,j)
13        c(1:m,j) = a(1:m,i+1) + i
14      enddo
15    case 3: // 3 unroll
16      do i = 1, 32
17        a(1:m,j) = b(1:m,j)
18        c(1:m,j) = a(1:m,i+1) + i
19      enddo
20    case 4: // full unroll EXPAND EXECUTION STATEMENT BY ARRAY SIZE (n=4)
21      do i = 1, 32
22        a(1:m,j) = b(1:m,j)
23        c(1:m,j) = a(1:m,i+1) + i
24      enddo
25    case 6: // full unroll EXPAND EXECUTION STATEMENT BY ARRAY SIZE (n=3)
26      do i = 1, 32
27        a(1:m,j) = b(1:m,j)
28        c(1:m,j) = a(1:m,i+1) + i
29      enddo
33    case 8: // full unroll EXPAND EXECUTION STATEMENT BY ARRAY SIZE (n=2)
34      do i = 1, 32
35        a(1:m,j) = b(1:m,j)
36        c(1:m,j) = a(1:m,i+1) + i
37      enddo
38    case 16: // SCALAR EXECUTION RETURN TO ORIGINAL LOOP STRUCTURE
39      do i = 1, 32
40        do j = 1, m
41          a(j,i) = b(j,i)
42          c(j,i) = a(j,i+1) + i
43        enddo
44      enddo
45  else // n>VL AND VL THAT DOES NOT CAUSE SFL_2 (NOT INCLUDED
46  IN VL_array)
47    do i=1, 32
48      do j = 1, m, VL    //VL: 16
49        a(j: j+VL-1, i) = b(j: j+VL-1, i)
50        c(j: j+VL-1, i) = a(j: j+VL-1, i+1) + i
51      enddo
52    enddo
53  endif
```

FIG. 23

[3] UNROLLING     C53     vstore→vload  IN LOOP

```
01  real(4)::a(n,33), b(n,33), c(n,33)
02  if (VL IS INCLUDED IN VL_array AND n <= VL) {
03  select ( ceil(VL/n)-1 ) {
04  case 0:
05  case 1: // PROCESSING IS SAME FOR 0 AND 1 (DOES NOT unroll)
06    do i = 1, 32
07      a(1:m,j) = b(1:m,j)
08      c(1:m,j) = a(1:m,j+1) + i
09    enddo
10  case 2: // 2 unroll
11    do i = 1, 32, 2
12      a(1:m,j) = b(1:m,j)
13      c(1:m,j) = a(1:m,j+1) + i
14      a(1:m,j+1) = b(1:m,j+1)
15      c(1:m,j+1) = a(1:m,j+2) + i+1
16    enddo
17  case 3: // 3 unroll
18    do i = 1, 32, 3
19      a(1:m,j) = b(1:m,j)
20      c(1:m,j) = a(1:m,j+1) + i
21      a(1:m,j+1) = b(1:m,j+1)
22      c(1:m,j+1) = a(1:m,j+2) + i+1
23      a(1:m,j+2) = b(1:m,j+2)
24      c(1:m,j+2) = a(1:m,j+3) + i+2
25    enddo
26  case 4: // full unroll EXPAND EXECUTION STATEMENT BY ARRAY SIZE (n=4)
27    do i = 1, 32, 4
28      a(1:m,j) = b(1:m,j)
29      c(1:m,j) = a(1:m,j+1) + i
30      a(1:m,j+1) = b(1:m,j+1)
31      c(1:m,j+1) = a(1:m,j+2) + i+1
32      a(1:m,j+2) = b(1:m,j+2)
33      c(1:m,j+2) = a(1:m,j+3) + i+2
34      a(1:m,j+3) = b(1:m,j+3)
35      c(1:m,j+3) = a(1:m,j+4) + i+3
36    enddo
37  case 6: // full unroll EXPAND EXECUTION STATEMENT BY ARRAY SIZE (n=3)
38    do i = 1, 32, 3
39      a(1:m,j) = b(1:m,j)
40      c(1:m,j) = a(1:m,j+1) + i
41      a(1:m,j+1) = b(1:m,j+1)
42      c(1:m,j+1) = a(1:m,j+2) + i+1
43      a(1:m,j+2) = b(1:m,j+2)
44      c(1:m,j+2) = a(1:m,j+3) + i+2
45    enddo
46  case 8: // full unroll EXPAND EXECUTION STATEMENT BY ARRAY SIZE (n=2)
47    do i = 1, 32, 2
48      a(1:m,j) = b(1:m,j)
49      c(1:m,j) = a(1:m,j+1) + i
50      a(1:m,j+1) = b(1:m,j+1)
51      c(1:m,j+1) = a(1:m,j+2) + i+1
52    enddo
53  case 16: // SCALAR EXECUTION RETURN TO ORIGINAL LOOP STRUCTURE
54    do i = 1, 32
55      do j = 1, m
56        a(j,i) = b(j,i)
57        c(j,i) = a(j,i+1) + i
58      enddo
59    enddo
60  else // n>VL AND VL THAT DOES NOT CAUSE SFI_2 (NOT INCLUDED IN VL_array)
61    do i = 1, 32
62      do j = 1, m, VL   //VL: 16
63        a(j: j+VL-1, i) = b(j: j+VL-1, i)
64        c(j: j+VL-1, i) = a(j: j+VL-1, i+1) + i
65      enddo
66    enddo
67  endif
```

FIG. 25

LOOP_STRUCT

| LOOP TO BE OPTIMIZED | TRUE | | | FALSE |
|---|---|---|---|---|
| Loop_type | 1 | 2 | | NULL |
| UNROLCOUNT | Ceil(VL/n)-SFI_2_type | NULL | | |
| VL IS UNKNOWN | FALSE | FALSE | | NULL |
| SECONDARY SFI_2 | TRUE | TRUE | TRUE | FALSE |
| SFI_2_type | 0 | 1 | 0 | 1 | NULL |
| VL_array | NULL | 2,4,8,16 | | NULL |

COMPILER PROGRAM, COMPILING METHOD, INFORMATION PROCESSING DEVICE

CROSS-REFERENCE TO RELATED APPLICATION

This application is based upon and claims the benefit of priority of the prior Japanese Patent Application No. 2020-100151, filed on Jun. 9, 2020, the entire contents of which are incorporated herein by reference.

FIELD

The present invention relates to a compiler program, a compiling method, and an information processing device.

BACKGROUND

A compiler is a program that translates a program of a high-level programming language, e.g. Fortran or C programming language, into an assembly code or object code (machine language). The main function of the compiler includes, for instance, an analysis function of analyzing a source code of a high-level programming language, a function of generating an intermediate code of an intermediate language from the source code, a function of optimizing the intermediate code, and a code generation function of converting the optimized intermediate code into an assembly code or object code. The optimization function converts a plurality of scalar instructions into a vector instruction (or SIMD (Single Instruction Multiple Data) instruction, which is hereinafter referred to as "vector instruction"), unrolls a loop (loop unrolling), or performs scheduling of changing the order of instructions, for instance.

Japanese Patent Application Laid-open No. 2016-212573 and Japanese Patent Application Laid-open No. H09-160784 describe a compiler.

SUMMARY

A vector instruction loads, from consecutive addresses in a memory, a number of array elements commensurate with a vector length (hereinafter a vector length array elements or a vector length elements) from the first array element of the array to be processed by the vector instruction, stores the array elements into a vector register, and executes the vector length array elements by a single instruction code. A vector instruction with a mask register accesses an element of an array in a memory on the basis of a mask bit indicating whether the element is an element to be accessed among the vector length array elements.

Meanwhile, when a sequence of instructions is decoded, a microprocessor checks whether memory addresses to be accessed by a store instruction and memory addresses to be accessed by a subsequent load instruction overlap with each other, and when the result of checking is true, the microprocessor executes the instructions in accordance with the order of a program code, namely, in accordance with such a rule that the load instruction is executed after the store instruction is executed. In this manner, a phenomenon in which the load instruction is not executed until the store instruction immediately before the load instruction is finished is referred to as "Store Fetch Interlock (SFI)".

When a part of a mask bit of a mask register is TRUE (to be accessed) and the remaining mask bits are FALSE (not to be accessed), the above-mentioned vector instruction with a mask register accesses only a part of elements of the vector length array elements. Thus, in the vector instruction with a mask register, occurrence of original SFI has to be determined based on the mask bits of respective mask registers of consecutive store instruction and load instruction.

However, some microprocessor determines occurrence of SFI for a vector instruction on the basis of whether memory addresses of pieces of data of the vector length elements from the first array element to be processed by consecutive vector store instruction and vector load instruction overlap with each other. In this manner, when the memory addresses of the vector length array elements overlap with each other, but the memory addresses of array elements to be accessed by the vector instruction on the basis of the mask register do not overlap with each other, the original SFI does not occur, but SFI that depends on architecture of the microprocessor occurs. When the vector length of the microprocessor becomes greater, the length of an array to be processed by the vector instruction also becomes greater, which extends the area of memory addresses of the vector length array elements. As a result, the frequency of occurrence of SFI that depends on the above-mentioned architecture increases.

When the microprocessor executes consecutive store instruction and load instruction by in-order execution based on the SFI that depends on the architecture, the period of time for executing the instruction becomes longer than the case of executing the consecutive store instruction and load instruction by out-of-order execution. The SFI that depends on the architecture is not original SFI, and the consecutive store instruction and load instruction do not have to be executed by in-order execution. Therefore, it is desirable to execute the consecutive store instruction and load instruction by out-of-order execution to reduce the execution period.

A first aspect of an embodiment is a non-transitory computer readable storage medium that stores therein a compiler program causing a computer to execute optimization processing for an optimization target program, the optimization processing comprising: the optimization target program including a loop including a vector store instruction and a vector load instruction for an array variable, unrolling the vector store instruction and the vector load instruction in the loop by an unrolling number of times to generate a plurality of unrolled vector store instructions and a plurality of unrolled vector load instructions, the unrolling number of times including a first unrolling number of times, which is obtained by dividing a vector length by an array size of the array variable and rounding up a remainder, or a second unrolling number of times lower than the first unrolling number of times by one; and scheduling to move an unrolled vector load instruction among the plurality of unrolled vector load instructions, which is located after a first unrolled vector store instruction that is located at first among the plurality of unrolled vector load instructions, before the first unrolled vector store instruction.

According to the first aspect, a processor that executes a compiler program optimizes a vector instruction so as to avoid determination of SFI that depends on the architecture.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating a method of avoiding SFI_2 by unpacking.

FIG. 13 is a diagram illustrating a relationship between the array size n and the value of the ceil function ceil(VL/n) in the case of vector length VL=16.

FIG. 15 is a diagram illustrating loop unrolling and scheduling of optimization processing of avoiding SFI_2 in this embodiment.

FIG. 18 is a diagram illustrating an example of a source code including the loop to be optimized and an intermediate pseudo code after vectorization in the second embodiment.

FIG. 19 is a diagram illustrating an intermediate pseudo code C42 having branch structure in which the above-mentioned loop (rows 03 to 07) is converted into case-specific loops.

FIG. 20 is a diagram illustrating an intermediate pseudo code C43 obtained by loop unrolling each case-specific loop of the intermediate pseudo code C42, which has branch structure converted into the case-specific loops of FIG. 19, by the corresponding number of times of unrolling.

FIG. 21 is a diagram illustrating an example of a source code including the loop to be optimized and an intermediate pseudo code after vectorization in the second embodiment.

FIG. 22 is a diagram illustrating an intermediate pseudo code C52 having branch structure in which the innermost loop (rows 03 to 07) of the vectorized intermediate pseudo code C51 is converted into case-specific loops.

FIG. 23 is a diagram illustrating an intermediate pseudo code C53 obtained by unrolling each case-specific loop of the intermediate pseudo code C52 having branch structure in which the vectorized innermost loop is converted into the case-specific loops of FIG. 22 by the corresponding number of times of unrolling.

FIG. 25 is a diagram illustrating an example of the loop structure.

DESCRIPTION OF EMBODIMENTS

Definition of Terminology

In this specification, original SFI, which occurs when memory addresses of array elements to be accessed respectively by a preceding vector store instruction and a subsequent vector load instruction overlap with each other, is referred to as "primary SFI" and "SFI_1". In addition, SFI that depends on architecture of a microprocessor occurs when memory addresses of array elements to be accessed respectively by a preceding vector store instruction and a subsequent vector load instruction based on mask registers do not overlap with each other (primary SFI does not occur) but memory addresses of the vector length array elements of both vector instructions overlap with each other. SFI that depends on this microarchitecture is referred to as "secondary SFI" or "SFI_2". In addition, "memory addresses of the vector length array elements from the first array element of a vector instruction" is hereinafter simply referred to as "memory addresses of the vector length array elements of a vector instruction". And, a number of iteration times of a loop is referred to as "iteration count". A number of times of loop unrolling is referred a number of times of unrolling.

A compiler optimizes an intermediate code, which is generated from a source code being a high-level programming language, and converts the intermediate code into an assembly code or object code. The intermediate code is described in various languages depending on the compiler. Thus, in this specification, "intermediate pseudocode", which describes an intermediate code in a pseudo manner, is used to describe an embodiment. The intermediate pseudo-code may be described in a code identical to the assembly code. In a same manner, "assembly pseudocode" is used as the assembly code.

Information Processing Device and Compiling Method that Execute Compiler

Figure 1:
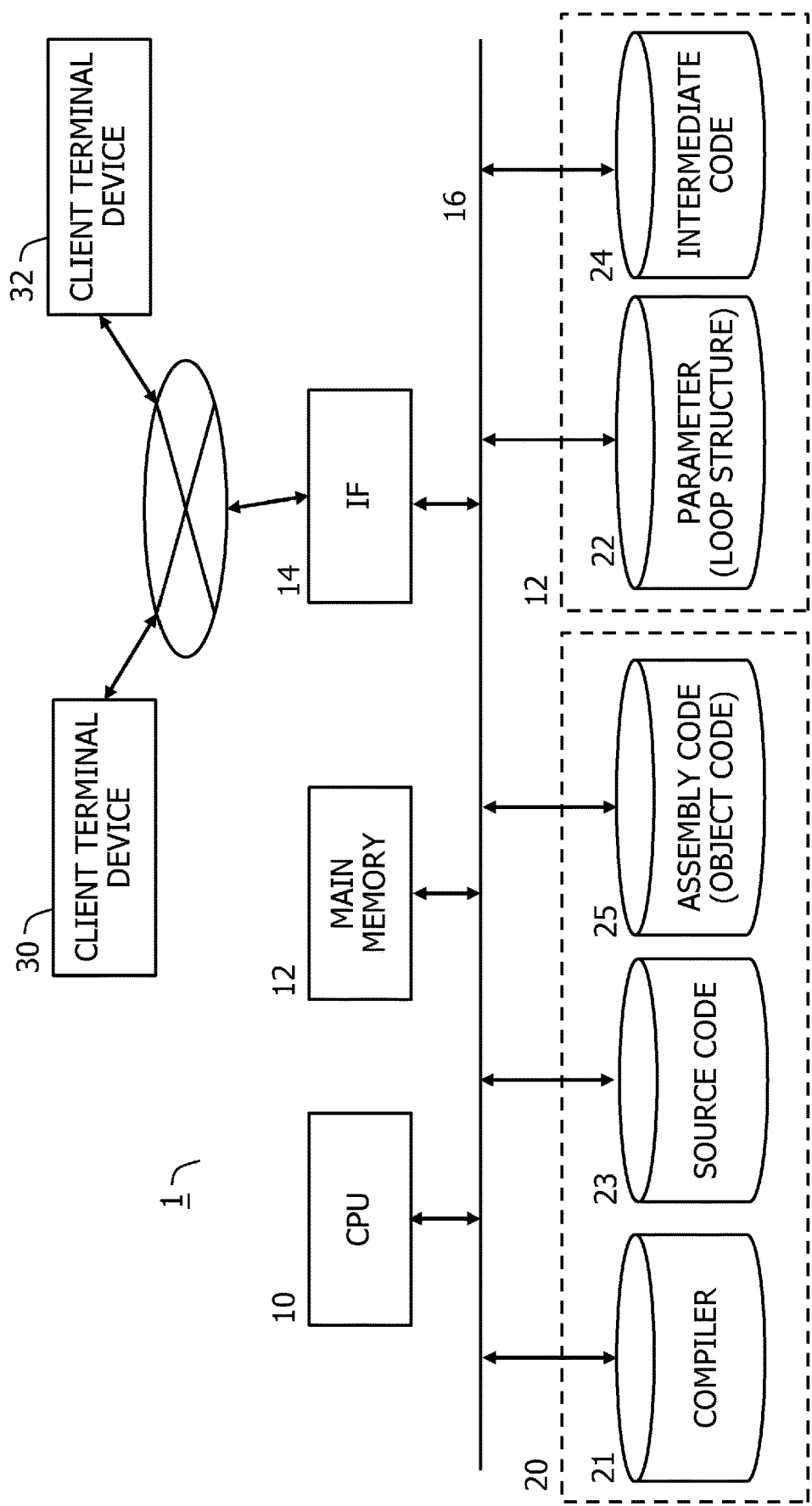
FIG. 1 is a diagram illustrating an exemplary configuration of an information processing device that executes a compiler.

FIG. 1 is a diagram illustrating an exemplary configuration of an information processing device that executes a compiler. The information processing device 1 includes a central processing unit (CPU) 10 being a processor, a main memory 12 to be accessed by the processor, an external interface 14, a storage 20 being an auxiliary storage device, and an internal bus 16 connecting those components to one another.

The storage 20 stores a compiler 21, a source code 23 to be compiled, and an assembly code or object code 25 obtained by converting the source code by the compiler. Furthermore, during execution of the compiler, the main memory 12 stores a parameter 22 to be generated at the time of compiling by the compiler and an intermediate code 24 generated from the source code. The processor loads the compiler 21 into the memory 12, and executes the loaded compiler. The source code is a code of a high-level programming language, e.g., Fortran, C programming language, and C++. The intermediate code is a program code generated from the source code by the processor that executes the compiler, and is subjected to optimization processing of the compiling processing.

Figure 2:
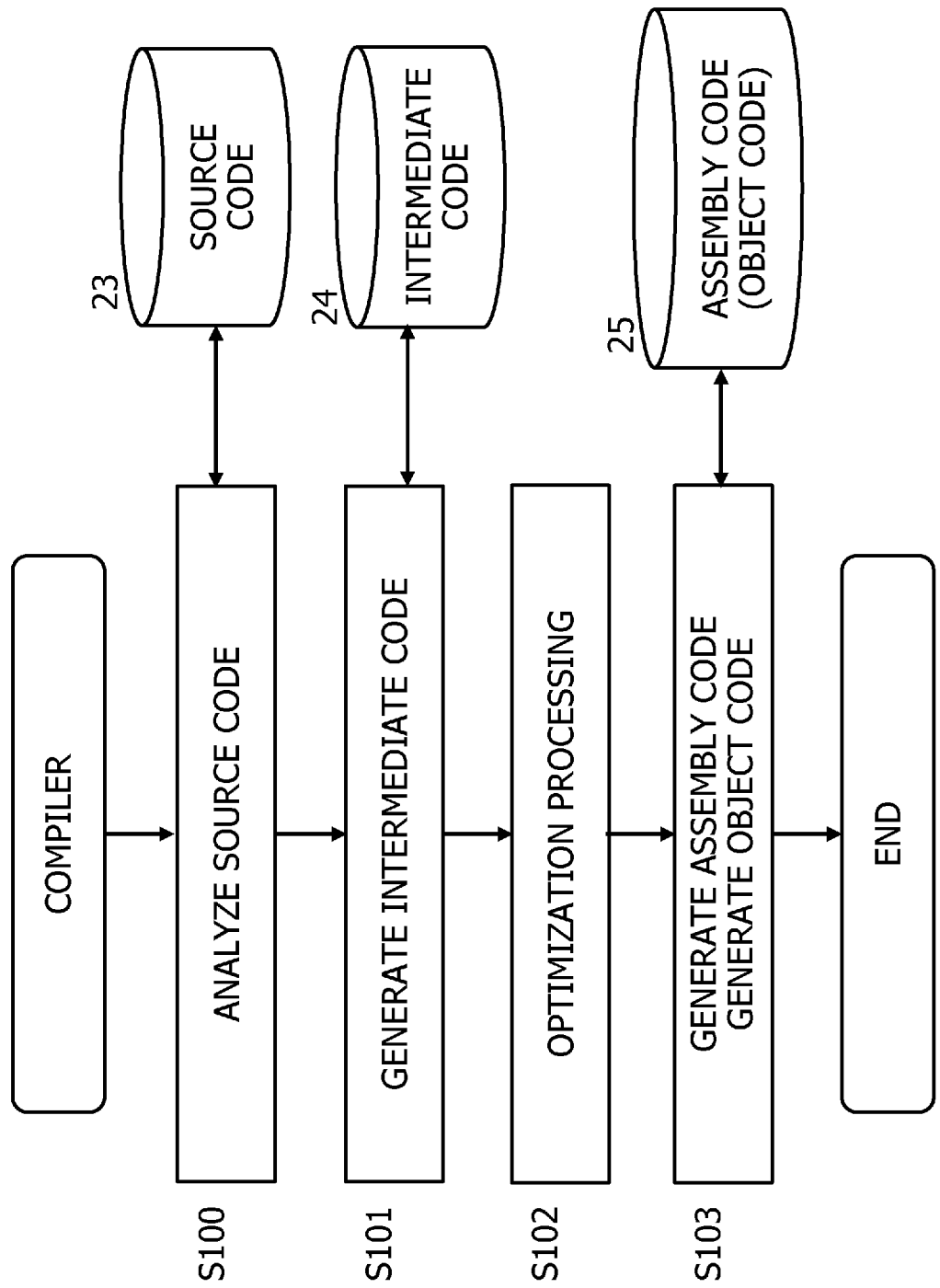
FIG. 2 is a diagram illustrating a flow chart of the compiling processing by the compiler.

FIG. 2 is a diagram illustrating a flow chart of the compiling processing by the compiler. The processor executes the compiler to execute next processing. The processor analyzes the source code 23 to be compiled (S100). Analysis of the source code includes, for instance, lexical analysis, syntactic analysis, and semantic analysis of the source code. Next, the processor generates the intermediate code 24 from the source code 23 based on the result of analyzing the source code (S101). Then, the processor executes the processing of optimizing the intermediate code to obtain an intermediate code changed so as to achieve reduction of the calculation period (S102). After the optimization processing, the processor converts the intermediate code into an assembly code or object code (S103).

Figure 3:
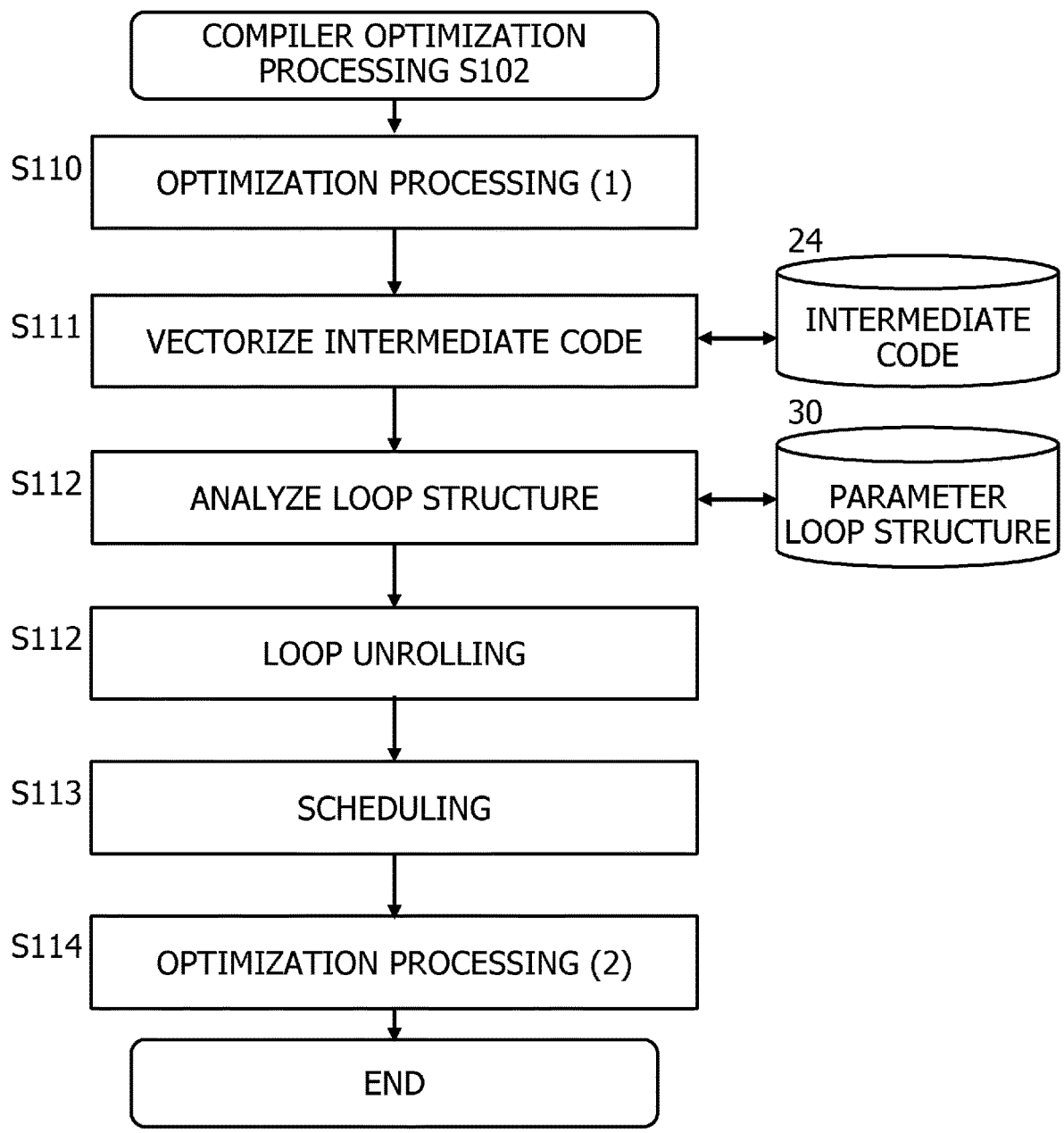
FIG. 3 is a diagram illustrating a detailed flow chart of the optimization processing S102 by the compiler.

FIG. 3 is a diagram illustrating a detailed flow chart of the optimization processing S102 by the compiler. The processor executes the compiler to execute the optimization processing S102 illustrated in FIG. 3. The processor executes first optimization processing of the intermediate code (S110). The first processing includes, for instance, converting multi-loop structure into a single loop. Then, the processor executes vectorization of replacing the same instruction code that processes of a plurality of pieces of data of the intermediate code with a vector instruction (S111). Then, the processor analyses the loop structure to detect loop structure to be optimized in this embodiment (S112). In addition, the processor executes loop unrolling (S112) and scheduling (S113) for the loop structure to be optimized. Lastly, the processor executes second optimization processing (S114).

The loop unrolling is processing of expanding (unrolling) a instruction in the loop and reducing the number of times of iteration. The scheduling is, for instance, processing of changing the order of instructions to enable the processor to execute the instructions by out-of-order execution.

SFI_2

Figure 4:
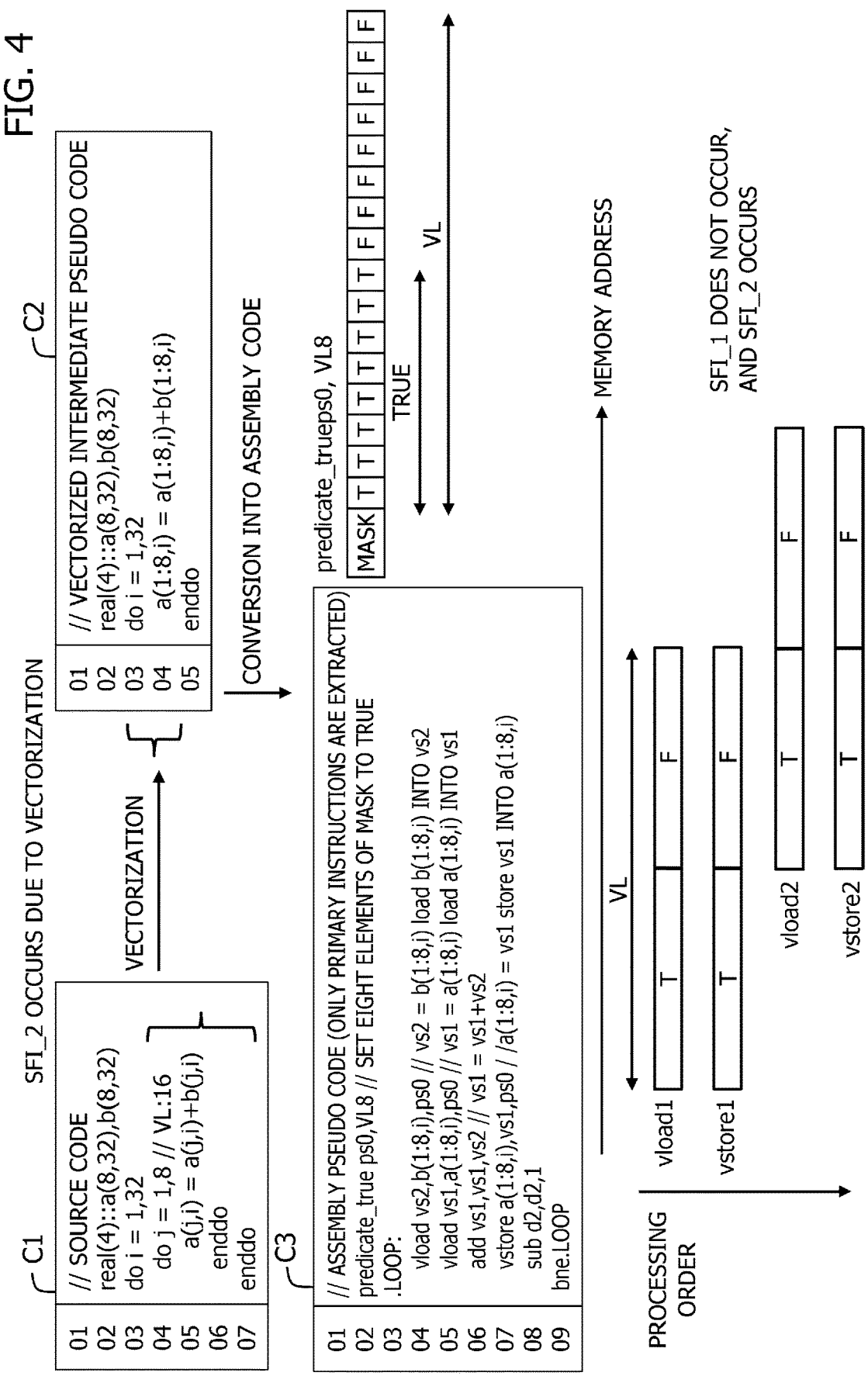
FIG. 4 is a diagram illustrating an example of occurrence of SFI_2.

FIG. 4 is a diagram illustrating an example of occurrence of SFI_2. A code C1 is an example of the source code. In the source code C1, arrays a(8,32) and b(8,32) are declared as a real number (4) of 4-byte single-precision (row 02), and a primary loop (rows 04 to 06) is included in a secondary loop (rows 03 to 07). In the innermost (primary) loop (rows 04 to 06), a calculation instruction of adding array a(j,i) and b(j,i) to each other and inputting the sum into the array a(j,i) is described (row 05). Furthermore, when the size of the vector register is set as 512 bit, and the size of an element of the array is set as 4-byte of single-precision as described above, a vector length VL is given below.

Vector length VL=the size (512 bit) of the vector register/ the size (4 byte) of an element of the array=16.

Namely, the vector length VL is the maximum number of elements of the array that can be processed by a vector instruction. When the size of the vector register is 512 bit, and the element size of the array is 8 byte of double-precision, the vector length VL is 8.

When the calculation instruction of the innermost loop of the source code C1 is vectorized, a vectorized intermediate pseudocode C2 is generated. In the intermediate pseudocode C2, the calculation instruction of the innermost loop of the source code C1 is vectorized to obtain a calculation instruction (row 04) changed so as to add the array a(1:8,i) and b(1:8,i) to each other and input the sum into the array a(1:8,i). The intermediate pseudocode C2 is represented in a pseudo manner by a code identical to the source code C1.

Then, when the code C2 is converted into an assembly code, an assembly pseudocode C3 is obtained. Only the major instructions are extracted and are described in the assembly pseudocode C3. The loop (rows 03 to 05) of the code C2 is converted into a loop (rows 03 to 09) including an assembly code of a load instruction, an add instruction, a store instruction, and a subtraction instruction in the code C3. The codes of the row 02, the rows 04 to 07, and the row 08 have the following meanings.

row 02: A mask register "predicate_true ps0" has 4-byte (ps: predicate single) elements, and the first eight elements are TRUE "VL8" and the remaining eight elements are FALSE. A specific mask register MASK is described on the right side of the row 02.

row 04: A vector load instruction vload with a mask register ps0 that loads pieces of data of first to eighth elements of an array b(1:8,i) from the memory into a vector register vs2. The vector register vs2 has 4-byte single-precision elements (vs: vector single).

row 05: A vector load instruction vload with the mask register ps0 that loads pieces of data of first to eighth elements of an array a(1:8,i) from the memory into a vector register vs1. The vector register vs1 also has 4-byte single-precision array elements.

row 06: Add the vector registers vs1 and vs2, and store the sum into vs1.

row 07: A vector store instruction vstore with the mask register ps0 that stores data of the vector register vs1 into the array a(1:8,i) in the memory.

row 08: Subtract 1 from the value of a register d2 storing a control variable i of the loop to −1.

Figure 5:
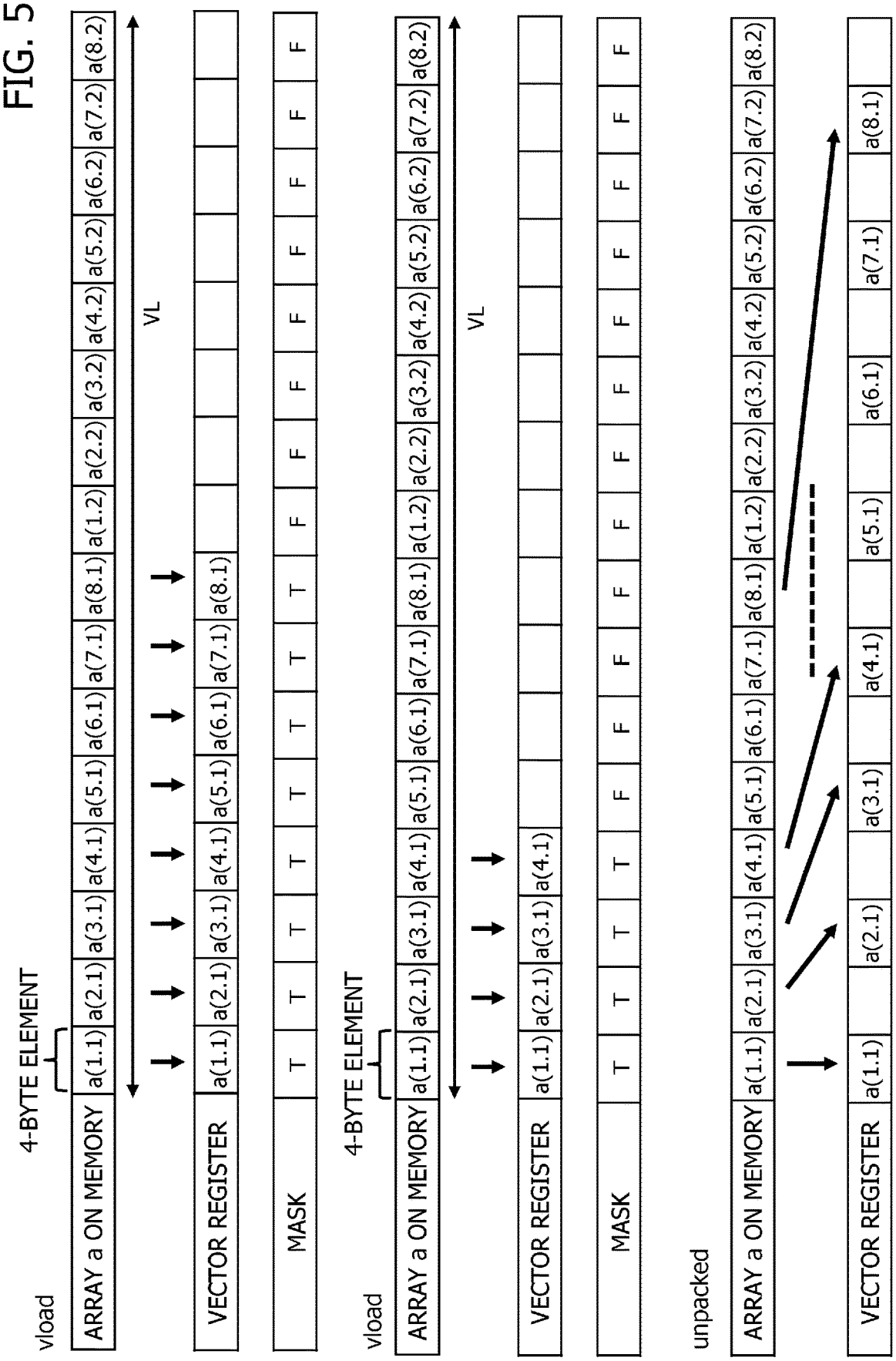
FIG. 5 is a diagram illustrating an exemplary relationship among a position of an element of an array of the vector load instruction with the mask register in the memory, the vector register, and the mask register.

FIG. 5 is a diagram illustrating an exemplary relationship among a position of an element of an array of the vector load instruction with the mask register in the memory, the vector register, and the mask register. In a same manner as in FIG. 4, the vector register size is 512 bit, the element size of the array is 4 byte, and the vector length VL is 16. Pieces of data of respective elements of the array a(8,32) are stored in consecutive addresses of the memory in order of a(1,1) to a(8,1) and a(1,2) to a(8,2). When the vector register size is 512 bit and the size of one element of the array is 4 byte (single precision), the vector length is 16 as described above, and the sixteen array elements are stored in the memory using the capacity of 16×4 byte×8 bit=512 bit. In FIG. 5, the arrow of VL indicates an address area of VL array elements from the first array element in the memory.

Then, in the vector load instruction, the processor accesses pieces of data of sixteen array elements in the memory to store the sixteen elements into the vector register. In contrast, in the vector store instruction, the processor stores sixteen array elements stored in the 512-bit vector register into the memory with the capacity of 512 bit.

In the top vector load instruction vload with the mask register of FIG. 5, the former eight elements of the mask register MASK is TRUE (T) and the latter eight elements of the mask register MASK is FALSE (F). When the vector load instruction with this mask register is executed, the processor loads eight elements a(1,1) to a(8,1) of the array a(8,32) in the memory into first eight elements of the vector register based on the mask register. In this case, the processor accesses the address of the first element a(1,1) to the address of the eighth element a(8,1) in the memory, which are to be processed by the vector load instruction, stores loaded pieces of data of the eight elements into the first eight elements of the vector register.

In the second vector load instruction vload with the mask register, among sixteen elements of the mask register, the former four elements of the mask register is TRUE (T), and the latter remaining twelve elements of the mask register is FALSE (F). In this case, the processor accesses the addresses of the four elements a(1,1) to a(4,1) of the array a(8,32) in the memory based on the mask register, and loads read pieces of data of the four elements into the first four elements of the vector register.

In this manner, when the vector instruction with the mask register is executed, the processor accesses a part of elements among the vector length VL elements in the memory, and stores the part of elements into the vector register or stores the part of elements of the vector register into the memory. The mask register is usually generated identically to the code C3 when the compiler generates an assembly code or object code. The compiler generates a mask register when the vector instruction does not process all the vector length elements.

Referring back to FIG. 4, when the processor executes the code C3, as illustrated at the bottom of FIG. 4, the memory addresses of elements (elements for which mask register is TRUE) to be accessed by the vector store instruction vstore1 in the first iteration and the vector load instruction vload2 in the second iteration respectively based on the mask register do not overlap with each other. However, the memory addresses (memory addresses indicated by arrow VL) of the vector length VL array elements to be accessed by the vector instructions vstore1 and vload2 partially overlap with each other. In this case, the memory addresses of array elements to be accessed by both the vector instructions based on the mask register do not overlap with each other, and thus SFI_1 does not occur, whereas the memory addresses of the vector length VL array elements of both the vector instructions partially overlap with each other, and thus SFI_2 occurs.

Thus, when the decoder of the processor analyzes the code C3, the decoder determines SFI_2 occurs, and the adjacent vector instructions vstore1 and vload2 are executed by in-order execution. As a result, the processor does not execute those instructions by out-of-order execution, which increases the processing time.

Avoidance of SFI_2 by Conversion into Single Loop

Figure 6:
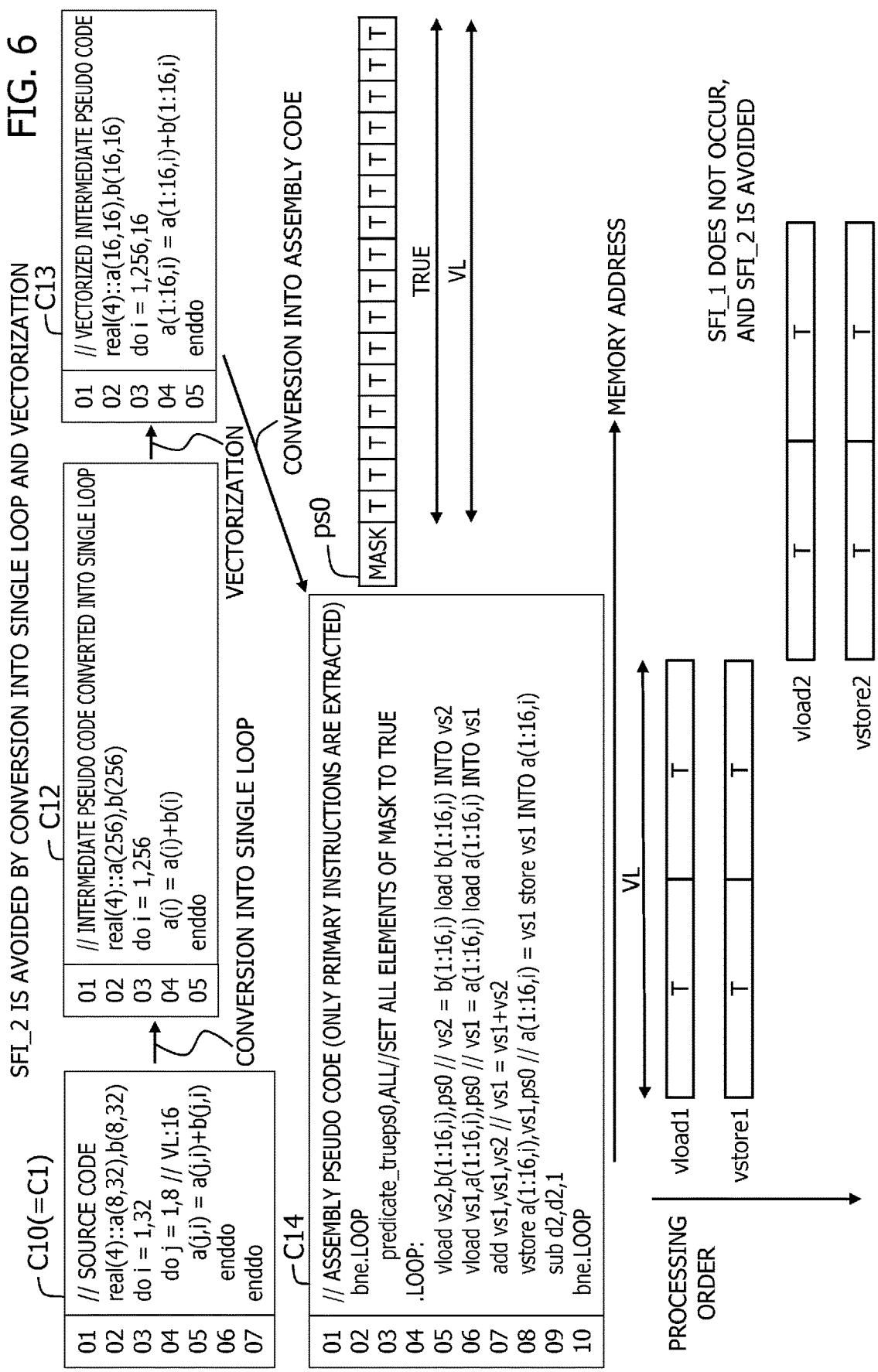
FIG. 6 is a diagram illustrating a method of avoiding SFI_2 by conversion into a single loop.

FIG. 6 is a diagram illustrating a method of avoiding SFI_2 by conversion into a single loop. The source code C10 of FIG. 6 is the same as the source code C1 of FIG. 4. In FIG. 4, the innermost loop iterates by using the control variable j=1 to 8 for the vector length VL=16. Thus, when a instruction in the innermost loop is converted into a vector instruction, the vector instruction accesses pieces of data of the first eight elements among the vector length 16 array elements. As a result, the addresses of elements to be accessed by the former vector store instruction vstore1 and the latter vector load instruction vload2 based on each mask do not overlap with each other. However, the addresses of the vector length VL=16 elements overlap with each other. Therefore, SFI_1 has not occurred but SFI_2 has occurred.

In contrast, in the example of FIG. 6, the processor that executes the compiler generates an intermediate code C12 that is changed to a single loop by deleting the innermost loop (rows 04 to 06) of the source code C10, and further generates an intermediate pseudo code C13 converted into a vector instruction (row 04) that accesses the vector length 16 array elements. The vector instruction (row 04) of the intermediate pseudo code C13 is as follows.

$$a(1:16,i)=a(1:16,i)+b(1:16,i)$$

That is, the number of pieces of data (number of array elements) of the vector instruction is equal to the vector length VL=16, and the control variable i for the loop is changed to be a multiple of 16 within 1 to 256.

The processor that executes the compiler generates an assembly pseudo code C14 based on the intermediate pseudo code C13. In this assembly pseudo code C14, the mask register ps0 is TRUE for all the vector length 16 array elements. As a result, in the case of the assembly pseudo code C14, the addresses of sixteen array elements to be accessed by the vector store instruction vstore1 and the vector load instruction vload2 of the array a(1:16,i) do not overlap with each other. That is, none of SFI_1 and SFI_2 occurs.

In this manner, when the array size 8 of the variable a(8:32) of the source code C10 and the number of times 8 (j=1-8) of iteration of the innermost loop (rows 04 to 06) match each other, a store instruction and a load instruction, which are consecutive across the loop, access pieces of element data of consecutive addresses on the memory, and thus the innermost loop is deleted to obtain a single loop so that the store instruction and the load instruction access consecutive addresses. That is, when both the instructions are converted into vector instructions for elements with the vector length 16, SFI_1 does not occur and SFI_2 can be avoided. It is indicated below the assembly pseudo code C14 of FIG. 6 that the addresses of the vector length 16 array elements to be accessed by the vector store instruction vstore1 in the first iteration and the vector load instruction vload2 in the second iteration respectively do not overlap with each other.

Avoidance of SFI_2 by Unpacking

FIG. 7 is a diagram illustrating a method of avoiding SFI_2 by unpacking. In the source code C20 of FIG. 7, the innermost loop (rows 04 to 06) has the iteration count 8 (j=1-8) for array variables a(9,32) and b(9,32). That is, the array size n of the array variable a(9,32) is n=9, whereas the iteration count m in the innermost loop is m=8, which are different from each other. In this case, the method of changing to a single loop as shown in FIG. 6 cannot be used due to n=9, m=8 as follows.

When a instruction in the innermost loop of the source code C20 is vectorized, the intermediate pseudocode C21 is generated. Furthermore, when the intermediate pseudocode C21 is converted into an assembly code, the assembly pseudo code C22 is generated. In the assembly pseudo code C22, the mask register ps0 corresponds to a single-precision array, and eight elements are TRUE, whereas the remaining eight elements are FALSE within the vector length 16. An access address relationship between the vector load instruction vload (row 05) and the vector store instruction vstore (row 07) for the variable a of this assembly pseudo code C22 is as illustrated in FIG. 8.

Figure 8:
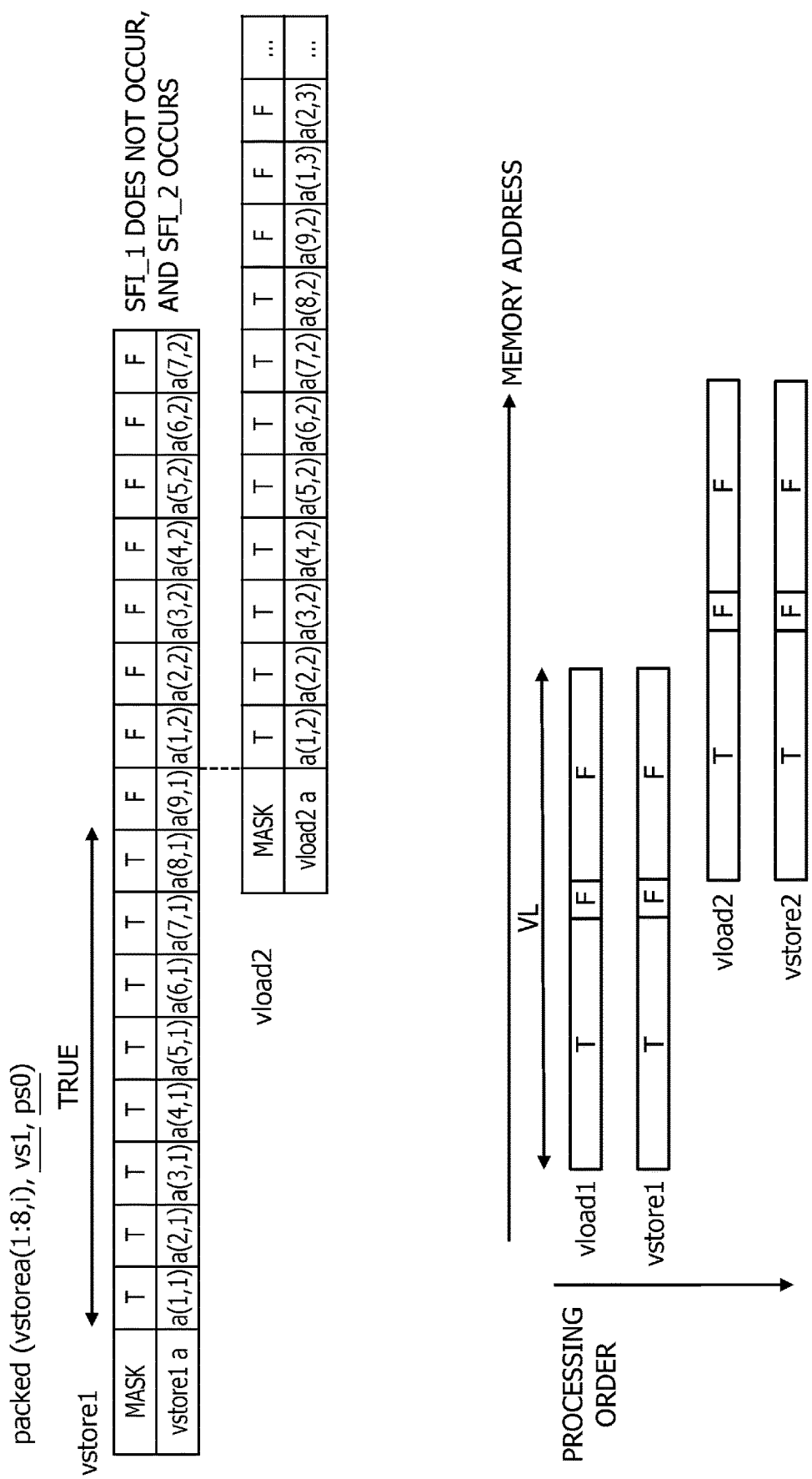
FIG. 8 is a diagram illustrating an access address relationship between the vector load instruction vload (row 05) and the vector store instruction vstore (row 07) of the assembly pseudo code C22.

FIG. 8 is a diagram illustrating an access address relationship between the vector load instruction vload (row 05) and the vector store instruction vstore (row 07) of the assembly pseudo code C22. FIG. 8 illustrates the mask register MASK of the vector store instruction vstore1 in the first iteration and array elements a(1,1)-a(9,1) and a(1,2)-a(7,2), and the mask register MASK of the vector load instruction vload2 in the second iteration and array elements a(1,2)-a(9,2) and a(1,3)-a(2,3) of the variable a on the memory. In this case, the iteration count of the loop is 8 for the array size 9, and the array element a(9,1) is not accessed. Thus, consecutive addresses are not accessed. In this case, the method of changing to a single loop cannot be used. As illustrated in the relationship between the processing order and the memory address of FIG. 8, the addresses (address of element for which mask register is TRUE) on the memory to be accessed by the vector store instruction vstore1 in the first iteration and the vector load instruction vload2 in the second iteration respectively do not overlap with each other, but the addresses of the vector length VL=16 elements of both the instructions overlap with each other. That is, SFI_1 does not occur, but SFI_2 may occur.

Referring back to FIG. 7, the processor that executes the compiler generates an assembly pseudo code C23 from the assembly pseudo code C22. Specifically, the processor that executes the compiler executes an unpacking instruction to change the size of one element of the instruction of the assembly pseudo code C22 from 4 byte to 8 byte, to thereby change a vector instruction with the vector length 16 to a vector instruction with the vector length 8.

"unpacked" of FIG. 5 illustrates a relationship between the array a on the memory and the vector register in an unpacking instruction. FIG. 5 is an example of the 4-byte single-precision vector length VL=16. As illustrated in FIG. 5, eight elements each having 4 byte are stored into a more significant bit side (or less significant bit side) of eight elements each having 8 byte in the vector register, and the less significant bit side (or more significant bit side) is set to 0, for instance. That is, on the assumption of VL=16, a packing instruction stores sixteen pieces of data into respective elements of 4 byte in the vector register, whereas an unpacking instruction stores eight pieces of data of 4 byte into respective elements of 8 byte. That is, the unpacking instruction stores eight pieces of data of 4 byte into the vector register at an interval of 8 byte.

In the assembly pseudo code C23 of FIG. 7, all the elements (eight elements) of the double-precision mask register pd0 (pd: precision double) corresponding to an 8-byte double-precision element are TRUE, and the vector registers vd1 and vd2 of the vector instructions vload and vstore with the array length 8 both have eight double-precision (vd: vector double) elements. Thus, the access address relationship between the vector load instruction vload (row 05) and the vector store instruction vstore (row 07) for the variable a of the assembly pseudo code C23 is as illustrated in FIG. 9.

Figure 9:
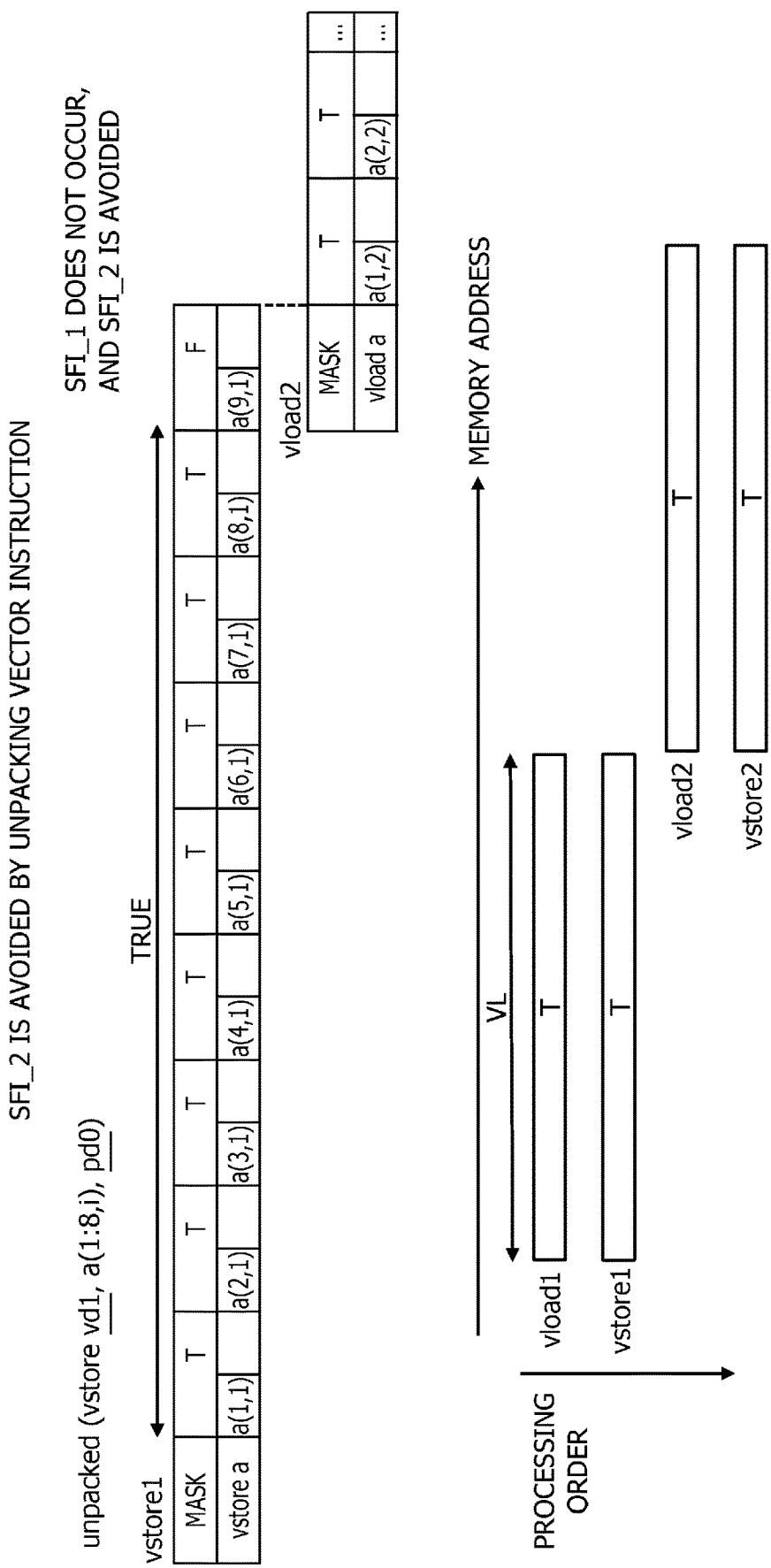
FIG. 9 is a diagram illustrating an access address relationship between the vector load instruction vload (row 05) and the vector store instruction vstore (row 07) of the assembly pseudo code C23.

FIG. 9 is a diagram illustrating an access address relationship between the vector load instruction vload (row 05) and the vector store instruction vstore (row 07) of the assembly pseudo code C23. FIG. 9 illustrates the mask register MASK of the vector store instruction vstore1 in the first iteration and array elements a(1,1)-a(9,1) of the variable a on the memory, and the mask register MASK of the vector load instruction vload2 in the second iteration and array elements a(1,2)-a(2,2) of the variable a on the memory. The left and right directions correspond to memory addresses. The addresses of eight elements on the memory to be accessed by the vector store instruction vstore1 in the first iteration based on the mask register and the addresses of eight elements on the memory to be accessed by the vector load instruction vload2 in the second iteration based on the mask register do not overlap with each other. This does not change the fact that SFI_1 does not occur. Furthermore, the addresses of the vector length 8 elements of the vector store instruction vstore1 in the first iteration and the addresses of the vector length 8 elements of the vector load instruction vload2 in the second iteration do not also overlap with each other. With this, SFI_2 is avoided.

As illustrated in the relationship between the processing order of the vertical axis and the memory address of the horizontal axis of FIG. 9, the address of the vector length 8 array elements to be accessed by the vector store instruction vstore1 in the first iteration and the address of the vector length 8 array elements to be accessed by the vector load instruction vload1 in the second iteration do not overlap with each other, and thus it can be understood that SFI_2 can be avoided.

As described above, when the array size n and the iteration count m of the loop do not match each other (m<n), for instance, when the array size n is n=9 and the iteration count m is m=8, consecutive addresses cannot be accessed, and conversion into a single loop as shown in FIG. 6 cannot be used. However, when the iteration count m of the loop and the vector length VL has a specific ratio, for instance, 1:2, SFI_2 can be avoided by unpacking.

Figure 10:
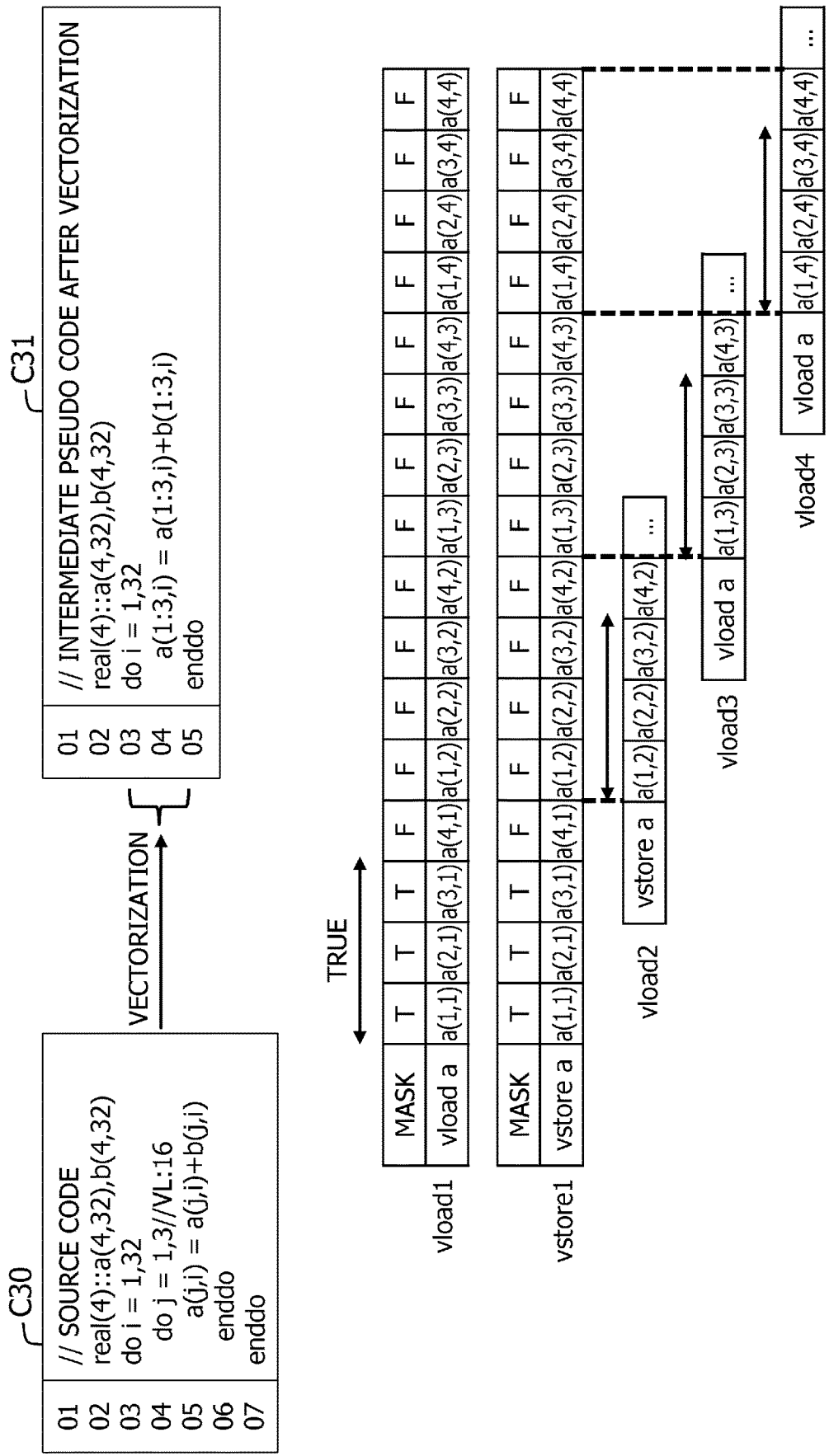
FIG. 10 is a diagram illustrating an example in which SFI_2 cannot be avoided by conversion into a single loop or unpacking.

Example in which SFI_2 Cannot Be Avoided by Conversion into Single Loop or Unpacking FIG. 10 is a diagram illustrating an example in which SFI_2 cannot be avoided by conversion into a single loop or unpacking. In the source code C30 illustrated in FIG. 10, the array size n of the array variable a(4,32) is n=4, and the iteration count m of the loop in the innermost loop (rows 04 to 06) is m=3, which satisfies m<n. Then, when a calculation instruction in the innermost loop of the source code C30 is vectorized, an intermediate pseudo code C31 is generated. This is an example of the innermost loop including a store instruction after a load instruction (store after load).

FIG. 10 illustrates the mask registers MASK of the vector load instruction vload1 and the vector store instruction vstore1 in the first iteration of a loop (rows 03 to 05) of the intermediate pseudo code C31 and arrays on the memory, and arrays on the memory of the vector load instructions vload2, vload3, and vload4 in the second to fourth iterations. Referring to FIG. 10, elements to be accessed by the vector store instruction vstore1 in the first iteration based on the mask register and elements to be accessed by the vector load instructions vload2 to vload4 in the second to fourth iterations based on the mask register do not overlap with each other. However, the memory addresses of the vector length 16 elements of the vector store instruction vstore1 in the first iteration and the memory addresses of the vector length 16 elements of the vector load instructions vload2 to vload4 in the second to fourth iterations overlap with each other. Thus, SFI_1 does not occur, but SFI_2 may occur.

As described above, in the source code C30, the array size n=4 of the array variable a(4,32) and the iteration count m=3 of the loop (same as number of elements to be accessed by vector instruction) in the innermost loop (rows 04 to 06) do not match each other, namely, m<n is satisfied, therefore, the vector instruction does not access consecutive addresses when repetition is made in the innermost loop. Furthermore, the iteration count m=3 of the loop and the vector length VL=16 do not have a specific ratio that enables use of an unpacking instruction, e.g., 1:2 or 1:4. Thus, in the example of the source code C30 of FIG. 10, SFI_2 cannot be avoided by conversion into a single loop or unpacking described above.

First Embodiment: Example in which Array Size n of Variable, Iteration Count m of Loop, and Vector Length VL Are Constants Example in which Loop Includes Store Command after Load Command (Store after Load)

In a first embodiment, the processor that executes the compiler optimizes a loop illustrated in FIG. 10 in which the array size n and the iteration count m of the loop are different from each other, namely, m<n is satisfied, and the iteration count m of the loop and the vector length VL do not have the specific ratio described above. Furthermore, the first embodiment is an example in which the array size n of a variable, the iteration count m of the loop, and the vector length VL of a loop to be optimized are constants.

Figure 11:
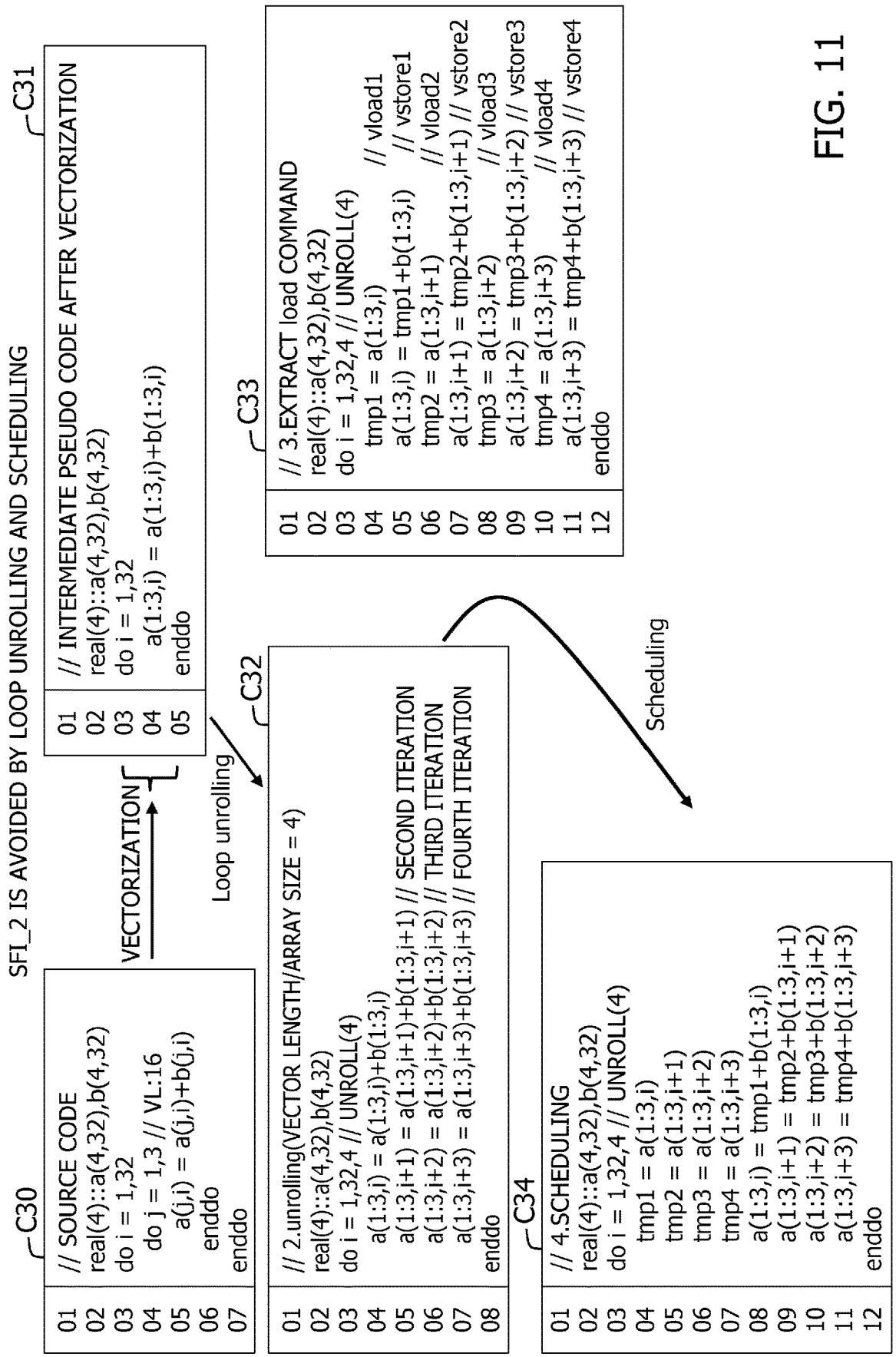
FIG. 11 is a diagram illustrating optimization processing (1) of avoiding SFI_2 in the embodiment.

FIG. 11 is a diagram illustrating optimization processing (1) of avoiding SFI_2 in the embodiment. This is an example (store after load) in which the innermost loop includes a store instruction after a load instruction. FIG. 11 illustrates the source code C30 of FIG. 10 and the intermediate pseudo code C31 in which a calculation instruction in the innermost loop are vectorized.

FIG. 10 illustrates arrays a(1,1) to a(4,4) on the memory of the vector load instruction vload1 and the vector store instruction vstore1 in the first iteration, and arrays a(1,1) to a(4,4) on the memory of the vector load instructions vload2, vload3, and vload4 in the second to fourth iterations in an assembly code that is converted from the intermediate pseudo code C31. In each loop, the control variable i is incremented from 1 to 32, and an array of j=1-3 is accessed by a vector instruction for the control variable j. That is, the arrays a(1,1)-a(3,1) are accessed in the first iteration, the array elements a(1,2)-a(3,2) are accessed in the second iteration, the array elements a(1,3)-a(3,3) are accessed in the third iteration, and the array elements a(1,4)-a(3,4) are accessed in the fourth iteration by respective vector instructions. Furthermore, the addresses of the array elements a(1,1)-a(3,1) to be accessed by the vector store instruction vstore1 in the first iteration and the addresses of the array elements to be accessed by the vector load instructions vload2, vload3, and vload4 in the second to fourth iterations respectively do not overlap with each other. This means the fact that SFI_1 does not occur between the vector store instruction vstore1 in the first iteration and the vector load instructions vload2, vload3, and vload4 in the subsequent second to fourth iterations. The addresses of the vector length 16 elements of the vector store instruction vstore1 in the first iteration and the addresses of the vector length 16 elements of the vector load instructions vload2, vload3, and vload4 in the second to fourth iterations overlap with each other, and thus SFI_2 may occur.

In view of this, in this embodiment illustrated in FIG. 11, the processor that executes the compiler unrolls four times the innermost loop (rows 03 to 06) including a vector calculation instruction (row 04) of the intermediate pseudo code C31 after vectorization, so as to generate an intermediate pseudo code C32. The loop (rows 03 to 05) of the intermediate pseudo code C31 is changed to an unrolled loop of rows 03 to 08 in the intermediate pseudo code C32. Through four times unrolling, the loop (rows 03 to 08) of the intermediate pseudo code C32 includes the following four vector calculation instructions. Those four vector calculation instructions are calculation instructions in the first to fourth iterations (i=1-4) of the original code C31.

$a(1:3,i)=a(1:3,i)+b(1:3,i)$ $a(1:3,i+1)=a(1:3,i+1)+b(1:3,41)$ //original second iteration $a(1:3,i+2)=a(1:3,i+2)+b(1:3,i+2)$ //original third iteration $a(1:3,i+3)=a(1:3,i+3)+b(1:3,i+3)$ //original fourth iteration Because of this, in the DO statement of the row 03, the control variable i is incremented to 32 by 4.

The number of times of unrolling is set to be 4 based on a function of dividing the vector length VL=16 by the array size n=4 of the variable a and rounding up the remainder, namely, ceil(VL/n)=ceil(16/4)=4. That is, as illustrated in FIG. 10, the addresses of the vector length elements of the vector store instruction vstore1 in the first iteration and the addresses of elements (respective three elements) to be accessed based on the mask registers of the vector load instructions vload1 to vload4 in the first to fourth iterations overlap with each other, whereas the addresses of the vector length elements of the vector store instruction vstore1 in the first iteration do not overlap with the addresses of elements to be accessed based on the mask register of a vector load instruction in the fifth or subsequent iteration. This is the reason for four times of unrolling.

Figure 12:
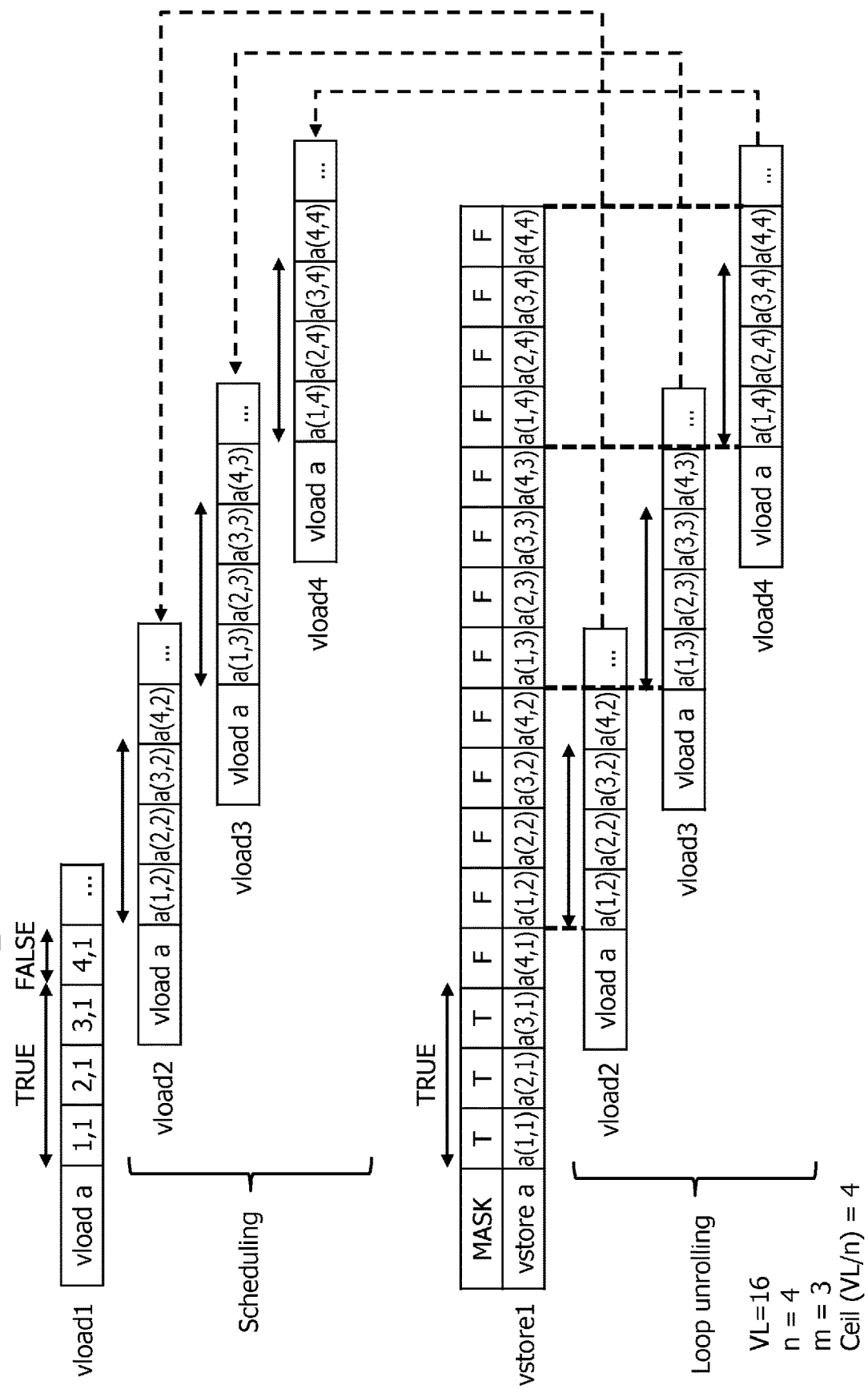
FIG. 12 is a diagram illustrating loop unrolling and scheduling of optimization processing of avoiding SFI_2 in this embodiment.

FIG. 12 is a diagram illustrating loop unrolling and scheduling of optimization processing of avoiding SFI_2 in this embodiment. FIG. 12 illustrates the addresses of the vector length elements of the vector store instruction vstore1 in the first iteration, which is identical to that of FIG. 10, and the addresses of elements (respective three elements) to be accessed based on the mask registers of the vector load instructions vload1 to vload4 in the first to fourth iterations.

As illustrated in FIG. 12, through the four times of unrolling, the vector load instructions vload2 to vload4 in the second to fourth iterations are positioned after (below in vertical direction) the vector store instruction vstore1 in the first iteration. Meanwhile, the vector load instruction vload1 in the first iteration is positioned before (above in vertical direction) the vector store instruction vstore1 in the first iteration. Furthermore, the addresses to be accessed by the vector store instruction vstore1 in the first iteration do not overlap with the addresses to be accessed by the vector load instructions vload2 to vload4 in the second to fourth iterations, with the result that SFI_1 being original SFI does not occur.

Therefore, the processor that executes the compiler executes scheduling of moving the vector load instructions vload1 to vload4 in the second to fourth iterations before the vector store instruction vstore1 in the first iteration among the vector calculation instructions unrolled four times. This is movement of an instruction indicated by the broken arrow of scheduling illustrated in FIG. 12. As a result of this scheduling, the vector load instructions vload1 to vload4 in the first to fourth iterations are positioned before the vector store instruction vstore1 in the first iteration, and thus, SFI_2 does not occur between both the instructions due to store after load and the processor that executes a compiled object code does not detect SFI. Thus, the processor can execute the vector load instructions vload1 to vload4 in the first to fourth iterations before the vector store instruction vstore1 in the first iteration, and therefore can also execute four vector load instructions by out-of-order execution, to thereby be able to reduce the calculation period by executing the four instructions in parallel, for instance.

FIG. 11 illustrates the processing of scheduling of the intermediate pseudo code C32 subjected to loop unrolling in a pseudo manner. The intermediate pseudo code C33 is generated by extracting a load instruction (temp #=a(1:3,#) where #=1-4) from four vector calculation instructions of the intermediate pseudo code C32. The extracted load instruction is a instruction of loading and inputting a variable a(1:3,#) into a register temp #. As a result, a sum of the register temp # and a variable b(1:3,#) is stored in the variable a(1:3,#) after the extracted load instruction.

Then, the processor that executes the compiler executes scheduling of moving the vector load instructions vload2 to vload4 in the second to fourth iterations of the intermediate pseudo code C33 before the vector store instruction vstore1 in the first iteration, to thereby generate an intermediate pseudo code C34.

The number of times of unrolling is the number of vector load instructions for which the addresses of the vector length elements of a vector store instruction and the addresses of elements to be accessed based on the mask register overlap with each other. That is, the number of times of unrolling is the value of the cell function ceil(VL/n) for the vector length VL and the array size n of the variable a described above.

FIG. 13 is a diagram illustrating a relationship between the array size n and the value of the cell function ceil(VL/n) in the case of vector length VL=16. When the vector length VL=16 is satisfied and the array size n of the variable a satisfies n<VL, n=1 to 15 is satisfied. FIG. 13 illustrates the value of the ceil function ceil(VL/n) and the value of ceil(VL/n)−1 for n=1 to 16. The value of the ceil function ceil(VL/n) is 4 in the case of the array size n=4 illustrated in FIG. 11 and FIG. 12.

Figure 14:
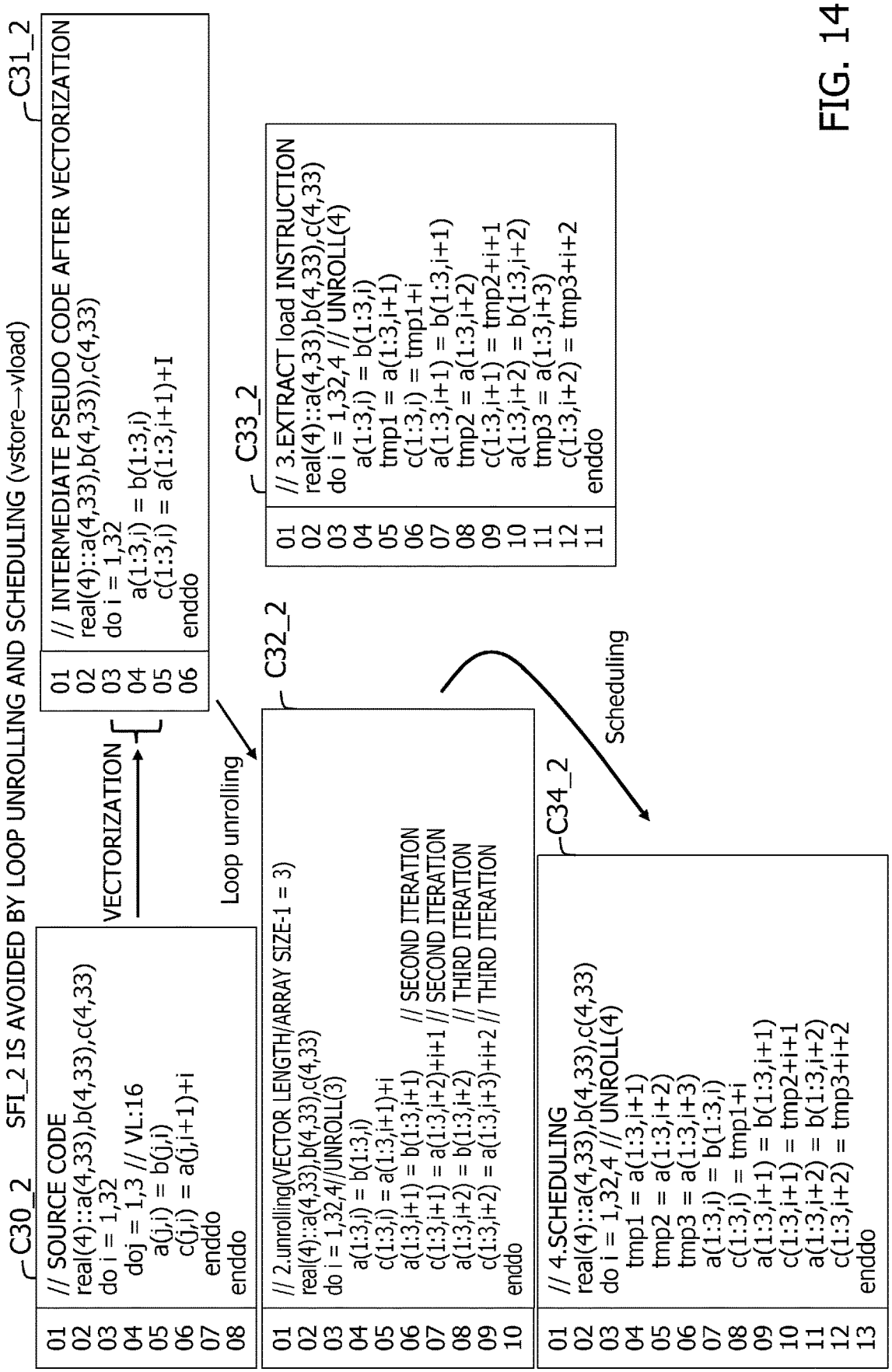
FIG. 14 is a diagram illustrating optimization processing (2) of avoiding SFI_2 in the embodiment.

Example of Loading after Storing when Loop Includes Load Instruction after Store Instruction FIG. 14 is a diagram illustrating optimization processing (2) of avoiding SFI_2 in the embodiment. FIG. 14 is an example of loading after storing when the innermost loop includes a load instruction after a store instruction. In the source code C30_2, the innermost loop (rows 04 to 07) includes a store instruction (row 05) for storing the array variable b into the array variable a in the memory and a load instruction (row 06) for loading the variable a from the array variable a in the memory. In the intermediate pseudo code C31_2, a plurality of instructions to be repeated in the innermost loop in C30_2 is converted into vector instructions (rows 04 and 05).

FIG. 15 is a diagram illustrating loop unrolling and scheduling of optimization processing of avoiding SFI_2 in this embodiment. FIG. 15 illustrates the vector length VL array elements a(1,1) to a(4,4) on the memory of the vector store instruction vstore1 in the first iteration, and array elements a(1,2) to a(4,2), a(1,3) to a(4,3), and a(1,4) to a(4,4) on the memory of the vector load instructions vload1, vload2, and vload3 in the first to third iterations in a case where the intermediate pseudo code C31_2 is converted into an assembly code. In each loop, the array elements a(j,i) with the control variable i being incremented from 1 to 32 and the control variable j=1-3 are accessed by a vector instruction. In the vector load instruction, the array elements a(1,2)-a(3,2) are accessed in the first iteration, the array elements a(1,3)-a(3,3) are accessed in the second iteration, the array elements a(1,4)-a(3,4) are accessed in the third iteration, and these array elements are accessed by respective vector instructions. Furthermore, the addresses of the array elements a(1,1)-a(3,1) to be accessed by the vector store instruction vstore1 in the first iteration based on the mask register and the addresses of the array elements to be accessed by the vector load instructions vload1, vload2, and vload3 in the first to third iterations respectively based on the mask register do not overlap with each other. This means the fact that SFI_1 does not occur between the vector store instruction vstore1 in the first iteration and the vector load instructions vload1, vload1, and vload3 in the subsequent first to third iterations. However, SFI_2 may occur.

Referring back to FIG. 14, in this embodiment, the processor that executes the compiler unrolls three times the vector calculation instructions (rows 04 and 05) of the vectorized intermediate pseudo code C31-2 to generate an intermediate pseudo code C32_2. The loop (rows 03 to 06) of the intermediate pseudo code C31-2 is changed to a loop of rows 03 to 10 in the intermediate pseudo code C32_2. Through three times of unrolling, the loop (rows 03 to 10) of the intermediate pseudo code C32-2 includes the following three sets of vector calculation instructions. Those three sets of vector calculation instructions are calculation instructions in the first to third iterations (i=1-3) of the original code C31_2.

$a(1:3,i)=b(1:3,i)$ $c(1:3,i)=a(1:3,i+1)+i$ $a(1:3,i+1)=b(1:3,i+1)$ //original second iteration $c(1:3,i+1)=a(1:3,i+2)+i+1$ //original second iteration $a(1:3,i+2)=b(1:3,i+2)$ //original third iteration $c(1:3,i+2)=a(1:3,i+3)+i+2$ //original third iteration Because of this, in the DO statement of the row 03, the control variable i is incremented by 3.

The number of times of unrolling is set to be 3 based on the cell ceil(VL/n)−1=ceil(16/4)−1=3. That is, the addresses of the vector length elements of the vector store instruction vstore1 in the first iteration and the addresses of elements to be accessed based on the mask registers of the vector load instructions vload1 to vload3 in the first to third iterations overlap with each other, whereas the addresses of the vector length elements of the vector store instruction vstore1 in the first iteration do not overlap with the addresses of elements to be accessed based on the mask register of a vector load instruction in the fourth or subsequent iteration. This is the reason for three times of unrolling.

FIG. 15 illustrates the addresses of the vector length elements of the vector store instruction vstore1 in the first iteration, which is identical to that of FIG. 12, and the addresses of elements to be accessed based on the mask registers of the vector load instructions vload1 to vload3 in the first to third iterations. As illustrated in FIG. 15, through the three times of unrolling, the vector load instructions vload1 to vload3 in the first to third iterations are positioned after the vector store instruction vstore1 in the first iteration. Furthermore, the addresses to be accessed by the vector store instruction vstore1 in the first iteration based on the mask register do not overlap with the addresses to be accessed by the vector load instructions vload1 to vload3 in the first to third iterations based on the mask registers, with the result that SFI_1 being original SFI does not occur.

In view of this, in this embodiment, the processor that executes the compiler executes scheduling of moving the vector load instructions vload1 to vload3 in the first to third iterations before the vector store instruction vstore1 in the first iteration among the vector calculation instructions unrolled three times. This scheduling is movement of instructions indicated by the broken arrows illustrated in FIG. 15. As a result of this scheduling, the vector load instructions vload1 to vload3 in the first to third iterations are positioned before the vector store instruction vstore1 in the first iteration, and thus, the processor that executes a compiled object code does not detect SFI_2 between the three vloads and the vstore. Thus, the processor can execute the vector load instructions vload1 to vload3 in the first to third iterations before the vector store instruction vstore1 in the first iteration, and can also execute three vector load instructions by out-of-order execution, to thereby be able to reduce the calculation period by parallel processing, for instance.

FIG. 14 illustrates the processing of scheduling of the intermediate pseudo code C32-2 subjected to loop unrolling in a pseudo manner. The intermediate pseudo code C33-2 and an intermediate pseudo code C34-2 after scheduling correspond to the codes C33 and C34 of FIG. 11, respectively. Thus, description thereof is omitted here.

In the example of loading after storing in the innermost loop, the number of times of unrolling is the number of vector load instructions for which the addresses of the vector length elements of a vector store instruction and the addresses of elements to be accessed based on the mask register overlap with each other. The positions of array elements of the vector store instruction vstore1 and the vector load instruction vload1 deviate from each other in the first iteration, and thus the number of times of unrolling is the value of ceil(VL/n)−1 obtained by subtracting one from the ceil function for the vector length VL and the array size n of the variable a. This is a value lower than the examples of FIG. 11 and FIG. 12 by one.

Figure 16:
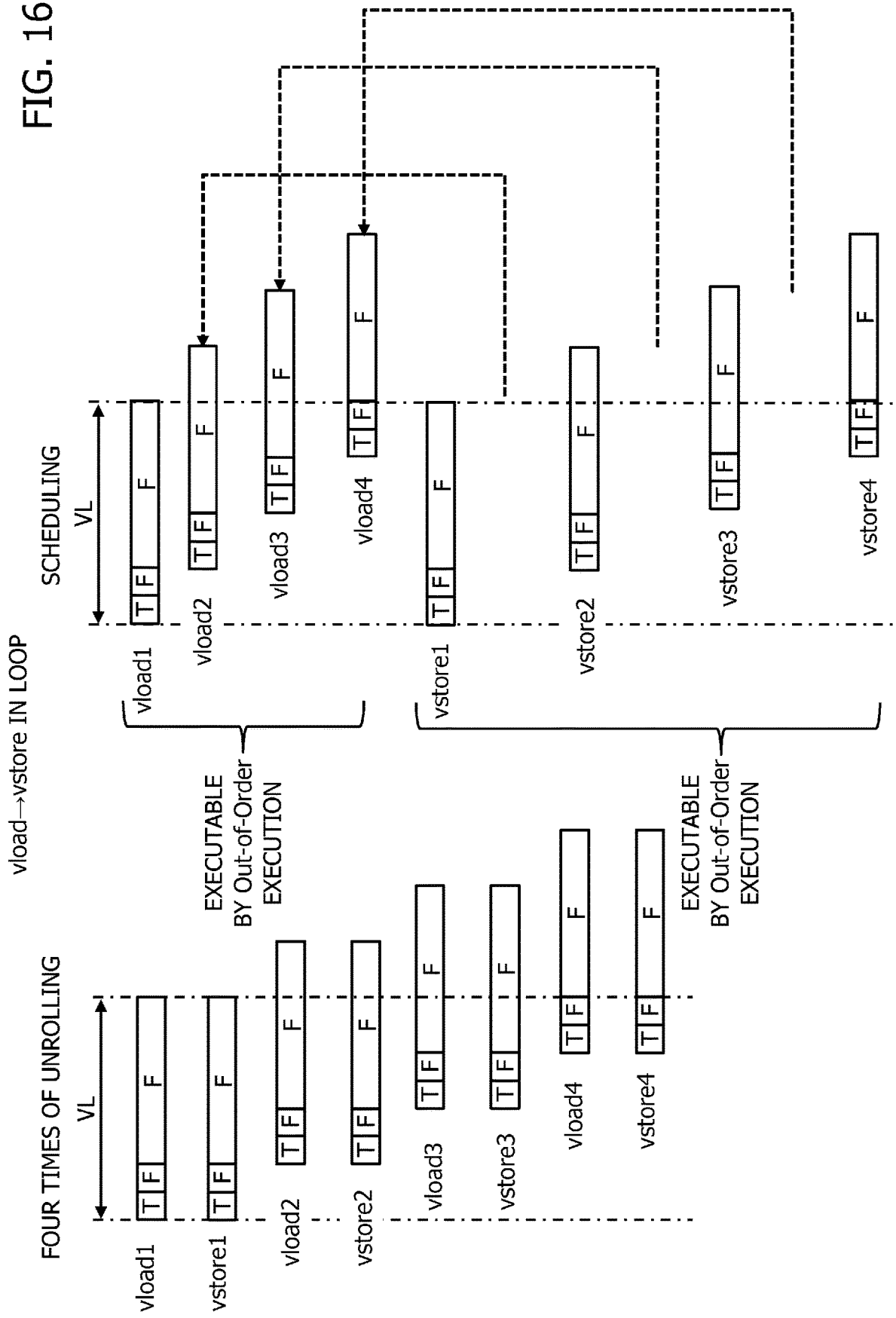
FIG. 16 is a diagram illustrating loop unrolling and scheduling in the case of a source code in which the loop includes a load instruction before a store instruction.

Summary of Example of Storing after Loading in Loop and Example of Loading after Storing in Loop Example of Storing after Loading in Loop FIG. 16 is a diagram illustrating loop unrolling and scheduling in the case of a source code in which the loop includes a load instruction before a store instruction. In a same manner as in FIG. 11, the preceding load instruction and the subsequent store instruction are instructions that access the same element of the same variable. FIG. 16 illustrates a relationship between memory addresses (horizontal direction) of the vector store instruction vstore and the vector load instruction vload of each loop after loop unrolling and scheduling. In FIG. 16, the vector length VL indicates the position of a memory address of the vector length array elements to be accessed by the store instruction vstore1 in the first iteration.

This embodiment discusses loop structure that enables avoidance of SFI_2, namely, loop structure in which the iteration count m of the loop is lower than the array size n (m<n) and the array size n is equal to or lower than the vector length VL (n=<VL). Thus, in the mask registers of the vector load instruction vload and the vector store instruction, the former m elements of the array are TRUE (T), the next n-m elements are FALSE (F), and the last VL-n elements are also FALSE (F). Furthermore, the addresses of the first elements of both the instructions deviate from each other by the array size n in the first iteration and the second iteration. The same applies to the third and subsequent iterations. Therefore, in a same manner as in FIG. 11, when VL=16 and n=4 are set, SFI_2 may occur between the vector store instruction vstore1 in the first iteration and the vector load instructions vload2 to vload4 in the second to fourth iterations.

In this example, the processor that executes the compiler executes four times of loop unrolling for the loop to be optimized, to expand (unroll) the vector load instructions vload and the vector store instructions vstore in the first to fourth iterations as illustrated in FIG. 16. Then, the processor that executes the compiler executes scheduling of moving the vector load instructions vload2 to vload4 in the second to fourth iterations, which are located after the first vector store instruction vstore1, before the first vector store instruction vstore1. As can be understood from the state after scheduling, the four vector load instructions vload1 to vload4 are positioned before the four vector store instructions vstore1 to vstore4, and thus the processor that executes the compiled object code does not determine SFI_2. Then, the processor can execute the four vector load instructions vload1 to vload4 by out-of-order execution.

Example of Loading after Storing in Loop

Figure 17:
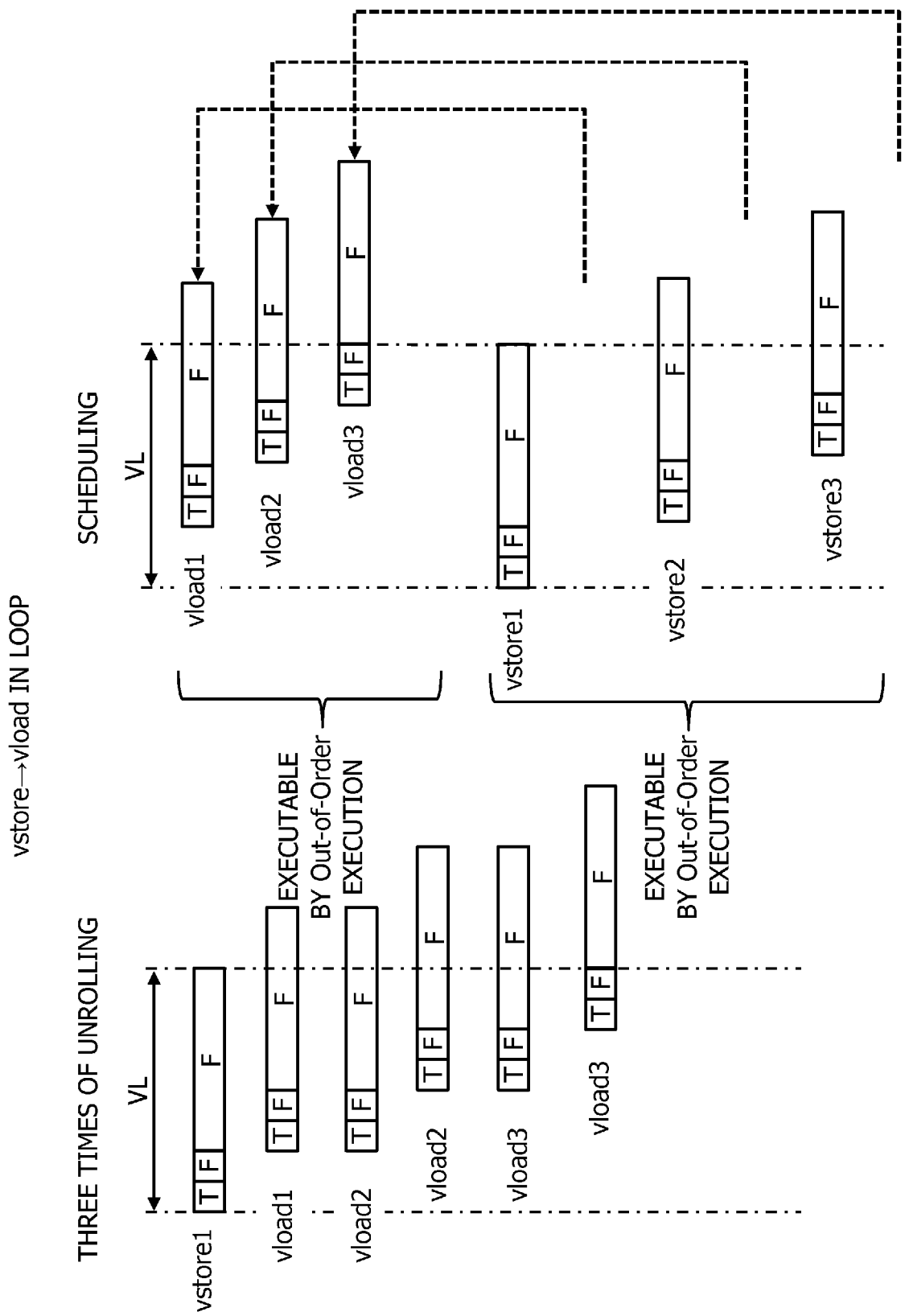
FIG. 17 is a diagram illustrating loop unrolling and scheduling in the case of a source code in which the loop includes a store instruction before a load instruction.

FIG. 17 is a diagram illustrating loop unrolling and scheduling in the case of a source code in which the loop includes a store instruction before a load instruction. In a same manner as in FIG. 14, the preceding store instruction and the subsequent load instruction in the same loop are instructions that access different elements of the same variable. Furthermore, in the first iteration, the addresses of first elements of a store instruction and a load instruction deviate from each other by the array size n. The same applies to the second and subsequent iterations. Therefore, when VL=16 and n=4, SFI_2 may occur between the vector store instruction vstore1 in the first iteration and the vector load instructions vload1 to vload3 in the first to third iterations.

In this example, the processor that executes the compiler executes three times of loop unrolling for the loop to be optimized, to expand (unroll) the vector load instructions vload and the vector store instructions vstore until the third iteration as illustrated in FIG. 17. Then, the processor executes scheduling of moving the vector load instructions vload1 to vload3 in the first to third iterations, which are located after the first vector store instruction vstore1, before the first vector store instruction vstore1. Under the state after scheduling, the three vector load instructions vload1 to vload3 are positioned before the three vector store instructions vstore1 to vstore3, and thus the processor that executes the compiled object code does not determine SFI_2. Therefore, the processor can execute the three vector load instructions vload1 to vload3 by out-of-order execution.

Second Embodiment: Example in which Array Size n of Variable and Iteration Count m of Loop are Variables, and Vector Length VL is Constant or Unknown Also in a second embodiment, the processor that executes the compiler optimizes a loop in which the array size n illustrated in FIG. 10 and the iteration count m of the loop are different from each other, namely, m<n is satisfied, and the iteration count m of the loop and the vector length VL do not have a ratio that enables application of unpacking described above. Furthermore, the second embodiment is an example in which the array size n of a variable and the iteration count m of the loop to be optimized are variables, and the vector length VL is a constant or unknown. The example of n>VL is excluded from the loop to be optimized. The meaning of the array size n and the iteration count m of the loop being variables is that the values of both variables will be established when the processor executes the compiled object code, and both the variables are not established at the time of compiling. Furthermore, the meaning of the vector length VL being unknown is that the vector length of the processor that executes the object code obtained by compiling the source program is unknown at the time of compiling.

Example in which Loop Includes Store Command after Load Command

FIG. 18 is a diagram illustrating an example of a source code including the loop to be optimized and an intermediate pseudo code after vectorization in the second embodiment. This example is an example in which the innermost loop (rows 04 to 06) includes a store instruction after a load instruction in the source code C40. In the source code C40, the array size n of the array variables a(n,32), b(n,32), c(n,32) is a variable, the iteration count m of the innermost loop is a variable, and the vector length VL is a constant or unknown. In this case, m=<n is satisfied logically, and m=<VL is assured when the loop of n>VL is excluded from the loop to be optimized. For example, FIG. 20 shows a source code C30 with m=3, n=4, VL=16, m=<n<16.

When the innermost loop of the source code C40 is vectorized by the iteration count m, an intermediate pseudo code C41 after vectorization is generated. In the intermediate pseudo code C41, the innermost loop (rows 04 to 06) of C40 are converted into the following calculation instructions.

```
do j = 1, m, VL //VL: 16
    a(j:j+VL-1,i) = a(j:j+VL-1,i) + b(j:j+VL-1,i)
enddo
```

In the case of the intermediate pseudo code C41 after vectorization, SFI_2 may be true depending on the relationship between the array size n and the vector length VL. As illustrated in FIG. 10, SFI_2 in this case corresponds to a case in which the addresses of the vector length elements of both instructions overlap with each other between the vector load instruction and the subsequent vector store instruction, but the addresses of elements to be accessed by both the instructions based on the mask registers do not overlap with each other.

In this embodiment, the compiler executes optimization processing of avoiding SFI_2 for such a loop. The outline of the optimization processing of avoiding SFI_2 is as follows.

(1) When the declared array size n of the array variable is a variable in the source code, the array size n is unknown at the time of compiling. Thus, the loop (rows 03 to 07) of the vectorized code C41 is converted into case-specific loops each including a vector load instruction and a vector store instruction in each innermost loop (rows 03 to 07) separately for each value (separately for each case) of a function ceil(VL/n) (or ceil(VL/n)−1 when there is a load instruction after a store instruction in the loop) of dividing the vector length VL by the array size n and rounding up the remainder.

FIG. 19 is a diagram illustrating an intermediate pseudo code C42 having branch structure in which the above-mentioned loop (rows 03 to 07) is converted into case-specific loops. The code C42 is an example of setting the vector length VL to VL=16. In the code C42, the rows 02 to 34 are case-specific loops in a case where the vector length VL is included in the array VL_array (array storing vector length VL that causes SFI_2) described later and the condition of if statement having the condition of n<=VL is true. The rows 35 to 42 is a loop in a case where the condition of if statement is false.

In the case-specific loops of the rows 02 to 34, a vector calculation instruction (row 04) of the innermost loop (rows 04 to 06) of the code C41 is described in each of cases 0 to 16 (case 0 to case 16) corresponding to a case in which the condition ceil(VL/n) of select statement of the row 03 is 0 to 16. In the case of the condition of if statement n<=VL is true, m<=VL is satisfied, and thus a vector calculation instruction of the innermost loop (rows 04 to 06) of the code C41 is set to be a code of rows 06 to 08, for instance, in the code C42 of FIG. 19. The following code is given.

```
06  do i = 1, 32
07      a(1:m,i) = a(1:m,i) + b(1:m,i)
08  enddo
```

As illustrated in ceil(VL/n) of FIG. 13, when the arrangement size n is n=8 to 15, ceil(VL/n)=2 is satisfied, which corresponds to the case 2 in the code C42 of FIG. 19.

(2) Next, loop unrolling (expanding) is performed by the number ceil(VL/n) of times of unrolling for each case-specific loop of the code C42 of FIG. 19, and scheduling of moving a vector load instruction subsequent to the first vector store instruction before the first vector instruction is performed among the unrolled instructions.

FIG. 20 is a diagram illustrating an intermediate pseudo code C43 obtained by loop unrolling each case-specific loop of the intermediate pseudo code C42, which has branch structure converted into the case-specific loops of FIG. 19, by the corresponding number of times of unrolling. In FIG. 20, scheduling is not executed yet. In the code C43, a vector calculation instruction is unrolled in the case-specific loop of cases 2 to 8 of rows 09 to 37. In the cases 2 and 3 of rows 09 to 19, loop unrolling is performed by the corresponding number (ceil(VL/n)=2 and 3) of times of cases. In contrast, in the cases 4, 6, and 8 of rows 20 to 37, the array statement size n is equal to or lower than the number ceil(VL/n)=4, 6, 8 of cases, and thus the number of times of unrolling is restricted to the array statement size n. The case 16 of rows 38 to 43 is an example of ceil(VL/n)=16, and the array size n=1 is satisfied. Thus, the iteration count m satisfies m=n=1, and vectorization is not performed, which returns to the loop structure of a scalar instruction of the original code C40. Rows 44 to 50 satisfy the condition of n>VL, and SFI_2 does not occur, which keeps the loop structure of the code C41.

Example in which Loop includes Load Command after Store Command

FIG. 21 is a diagram illustrating an example of a source code including the loop to be optimized and an intermediate pseudo code after vectorization in the second embodiment. This example is an example in which the innermost loop (rows 04 to 07) includes a load instruction after a store instruction. In the source code C50, the array size n of the array variables a(n,33), b(n,33), c(n,33) is a variable, the iteration count m of the innermost loop is a variable, and the vector length VL is a constant or unknown. In this case, m=<n is satisfied logically, and m=<VL is assured when the loop of n>VL is excluded from the loop to be optimized.

When the innermost loop of the source code C50 is vectorized by the iteration count m, an intermediate pseudo code C51 after vectorization is generated. In the intermediate pseudo code C51, the innermost loop (rows 04 to 07) of C50 are converted into the following calculation instructions.

```
do j = 1, m, VL //VL: 16
    a(j: j+VL-1, i) = b(j: j+VL-1 ,i)
    c(j: j+VL-1, i) = a(j: j+VL-1, i+1) + i
enddo
```

Also when the loop includes a load instruction after a store instruction, identical to the case (FIGS. 18, 19, and 20) of the loop including a store instruction after a load instruction, the optimization processing of avoiding SFI_2 by the compiler involves (1) converting the vectorized intermediate pseudo code C51 into a case-specific loop, and (2) executing loop unrolling and scheduling in each loop. The loop includes a load instruction after a store instruction, therefore the number of times of unrolling is Ceil(VL/n)−1, which is different from the case of the loop including a store instruction after a load instruction.

FIG. 22 is a diagram illustrating an intermediate pseudo code C52 having branch structure in which the innermost loop (rows 03 to 07) of the vectorized intermediate pseudo code C51 is converted into case-specific loops. This case is equivalent to FIG. 19 except for the number of times of unrolling, and thus description of FIG. 22 is omitted.

FIG. 23 is a diagram illustrating an intermediate pseudo code C53 obtained by unrolling each case-specific loop of the intermediate pseudo code C52 having branch structure in which the vectorized innermost loop is converted into the case-specific loops of FIG. 22 by the corresponding number of times of unrolling. FIG. 23 is equivalent to FIG. 20 except that the number of times of unrolling is ceil(VL/n)−1, and thus description of FIG. 23 is omitted.

Optimization Processing of Compiler for First and Second Embodiments

Next, description is given of the optimization processing of the compiler with reference to a flow chart. The optimization processing of the compiler described below is optimization processing to be executed for both of the loop to be optimized in the first embodiment and the loop to be optimized in the second embodiment. The loop to be optimized in the first embodiment is a loop in which the vector length VL and the array size n of the variable are constants, n<VL is true, and a program in the loop may cause SFI_2. The loop to be optimized in the second embodiment is a loop in which the vector length VL and the array size n of the variable are variables, whether n<VL is unknown, and a program in the loop may cause SFI_2.

Figure 24:
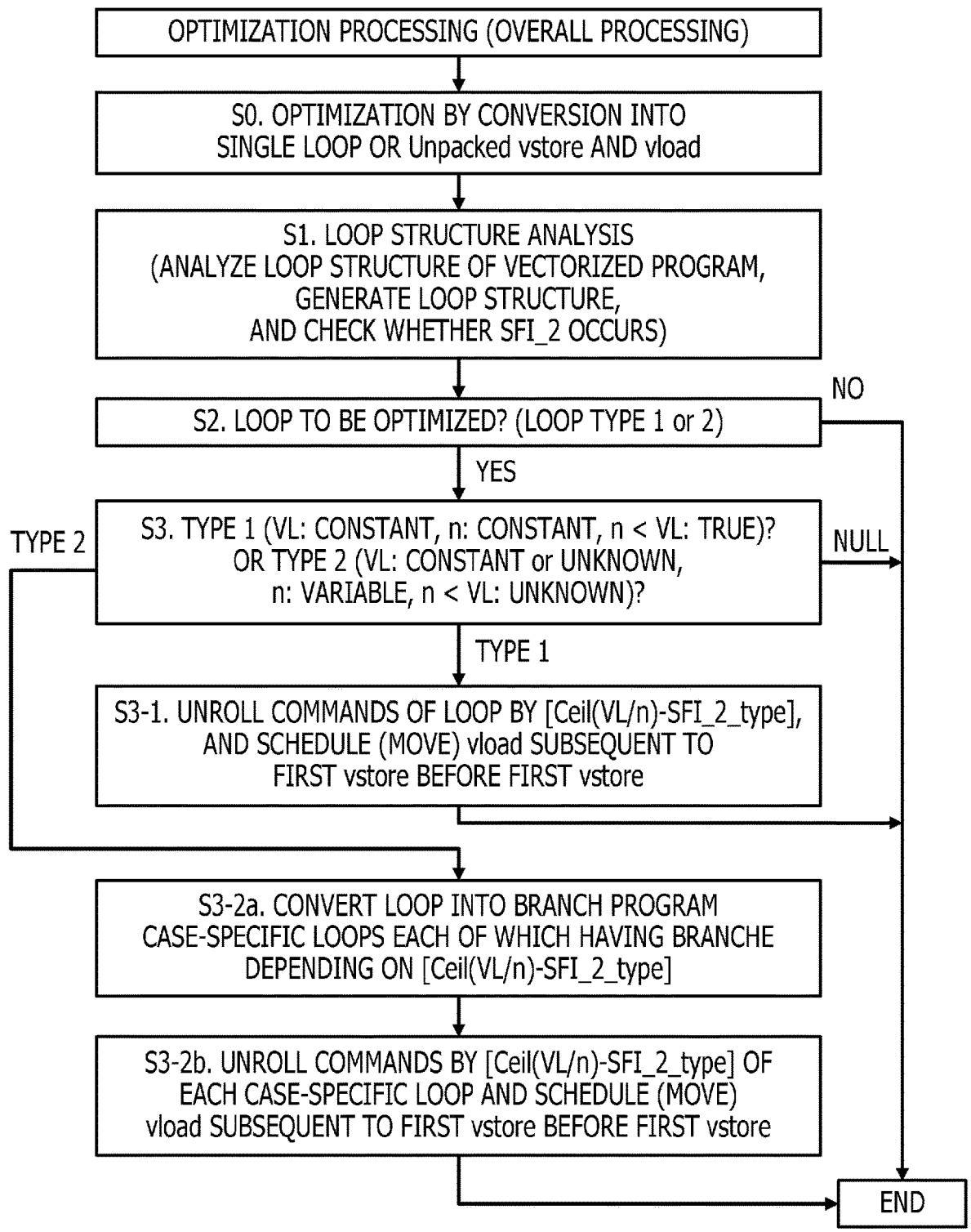
FIG. 24 is a diagram illustrating a flow chart of overall optimization processing of the compiler.

FIG. 24 is a diagram illustrating a flow chart of overall optimization processing of the compiler. The processor that executes the compiler optimizes predetermined loop structure in an intermediate code generated from a source program so that SFI_2 can be avoided by conversion into a single loop (deletion of innermost loop) or an unpacked store instruction and load instruction (S0).

Then, the processor that executes the compiler analyzes loop structure for a loop that cannot be optimized in the processing S0, and generates loop structure that stores loop structure information for each loop (S1). The loop to be analyzed is a loop including a vectorized store instruction and load instruction.

FIG. 25 is a diagram illustrating an example of the loop structure. The loop structure LOOP_STRUCT is data structure that stores a parameter including, for instance, loop features used for optimizing the loop. The loop structure includes parameters, e.g., whether the loop is a loop to be optimized (TRUE/FALSE), whether the loop type Loop_type is 1 or 2, the number of times of unrolling, whether the vector length VL is unknown, whether SFI_2 is to occur (TRUE/FALSE), whether the type SFI_2_type of SFI_2 is 0 or 1, and the array (VL_array) with the vector length VL that causes SFI_2.

The loop type 1 indicates a loop in which VL and n are constants and n<VL is true, which is the loop in the first embodiment. The loop type 2 indicates a loop in which VL is a constant or unknown, n is a variable, and n<VL is unknown, which is the loop in the second embodiment. The number of times of unrolling is ceil(VL/n)−SFI_2_type(0 or 1) in the case of the loop type 1, and NULL in the case of the loop type 2. The type SFI_2_type of SFI_2 is SFI_2_type=0 when the loop includes a store instruction after a load instruction, and is SFI_2_type=1 when the loop includes a load instruction after a store instruction. In the loop type 2, the vector length VL is unknown, and thus the processor that executes the compiler checks the vector length that causes SFI_2, and stores the value of the vector length VL for which occurrence of SFI_2 is detected into the vector length array VL array that causes SFI_2. In FIG. 25, VL=2, 4, 8, 16 are stored in Loop_type=2.

Referring back to FIG. 24, the processor that executes the compiler analyzes the loop structure of each loop, and generates the above-mentioned loop structure (S1). Then, the processor that executes the compiler determines whether each loop of the intermediate code is a loop to be optimized by referring to the loop structure (S2). The processor executes the processing S3, S3-1, S3-2a, and S3-2b for all the loops to be optimized (YES in S2), and finishes the processing when there is no loop to be optimized (NO in S2).

The processor that executes the compiler determines whether the loop to be optimized is the loop type 1 or the loop type 2 based on the loop structure (S3). When the loop type Loop_type=1 is satisfied, the processor unrolls [Ceil (VL/n)−SFI_2_type] times instructions in the loop (or only n times instructions in the loop when [Ceil(VL/n)−SFI_2_type]>array size n), and moves (schedules) the vector load instruction (or instructions) subsequent to the vector store instruction in the first iteration before the vector store instruction in the first iteration among the unrolled instructions (S3-1). The moved vector load instruction (or instructions) is (are) a load instruction (or instructions) in the [1-SFI_2_type]-th and subsequent iterations. The above-mentioned processing S3-1 in the case of the loop type 1 has been described with reference to FIG. 11 and FIG. 12, FIG. 16, and FIG. 18 to FIG. 20.

Meanwhile, in the case of the loop type 2, the processor that executes the compiler converts the loop into a program (branch program) having case-specific loops each of which branches depending on Ceil(VL/n) SFI_2_type (S3-2a). Furthermore, the processor unrolls [Ceil(VL/n)−SFI_2_type] times instructions for each case-specific loop of the branch program (or unrolls only n times instructions when [Ceil(VL/n)−SFI_2_type]>array size n). Furthermore, the processor moves the vector load instruction (or instructions) subsequent to the vector store instruction in the first iteration before the vector store instruction in the first iteration among the unrolled instructions (S3-2b). The moved vector load instruction (or instructions) is (or are) a load instruction (or instructions) in the [2-SFI_2_type]-th and subsequent iterations. The above-mentioned processing S3-2a and S3-2b in the case of the loop type 2 has been described with reference to FIG. 14 and FIG. 15, FIG. 17, and FIG. 21 to FIG. 23.

Figure 26:
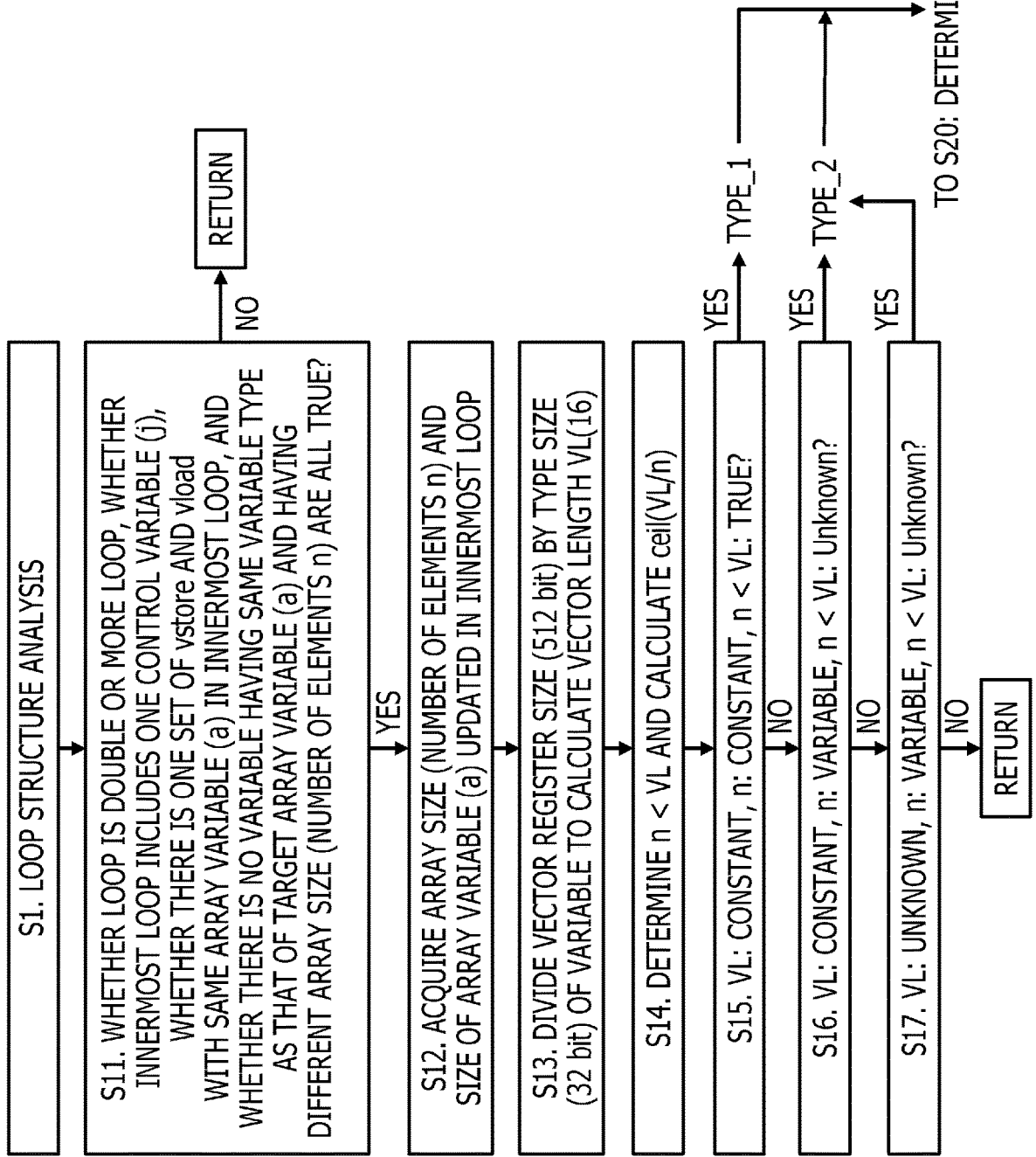
FIG. 26 is a diagram illustrating a flow chart of the processing of loop structure analysis S1.

FIG. 26 is a diagram illustrating a flow chart of the processing of loop structure analysis S1. The processor that executes the compiler determines whether the following conditions are all TRUE (S11). Specifically, the conditions are whether the loop of the intermediate code is a double or more loop (multi-loop), whether the innermost loop includes one control variable (j), whether there is one set of the vector store instruction and the vector load instruction with the same array variable (a) in the innermost loop, and whether there is no variable having the same variable type as that of the target array variable (a) and having a different array size (number of elements n). The processor executes the following processing when the result of determination is YES, or finishes the processing of S1 when the result of determination is NO.

The processor that executes the compiler acquires the array size (n) and the size of the array variable updated in the innermost loop (S12). Then, the processor divides the vector register size (byte number) by the type size (byte number) of the variable to calculate the vector length VL (S13). When the array size n is a constant, the vector length VL is determined, whereas when the array size n is a variable, the vector length VL is unknown.

Then, the processor determines whether n<VL is true, and calculates ceil(VL/n) (S14). Then, the processor executes the following determination of loop types.

S15: Determine the loop type as the type 1 (TYPE_1) when the vector length VL is a constant, the array size n is a constant, and n<VL is true.

S16: Determine the loop type as the type 2 (TYPE_2) when the vector length VL is a constant, the array size n is a variable, and n<VL is unknown.

S17: Determine the loop type as the type 2 (TYPE_2) when the vector length VL is unknown, the array size n is a variable, and n<VL is unknown.

Finish the processing when all the determinations of the above-mentioned processes S15 to S17 result in NO.

Figure 27:
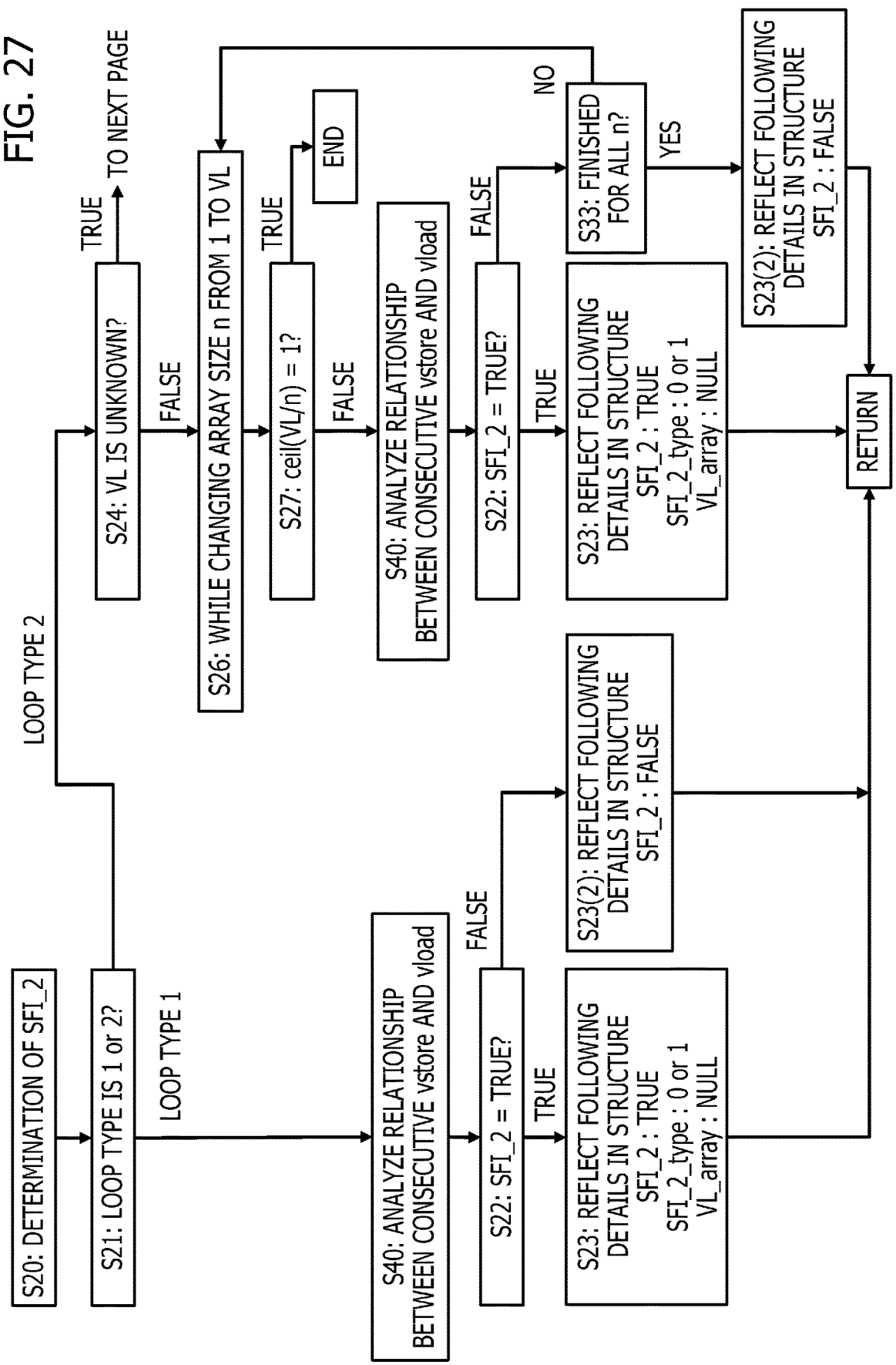
FIG. 27 and FIG. 28 are diagrams illustrating flow charts of the determination processing S20 of SFI_2.

When the loop type is the type 1 or the type 2, the processor executes determination processing of SFI_2 of FIG. 27 and subsequent FIGS.

Figure 28:
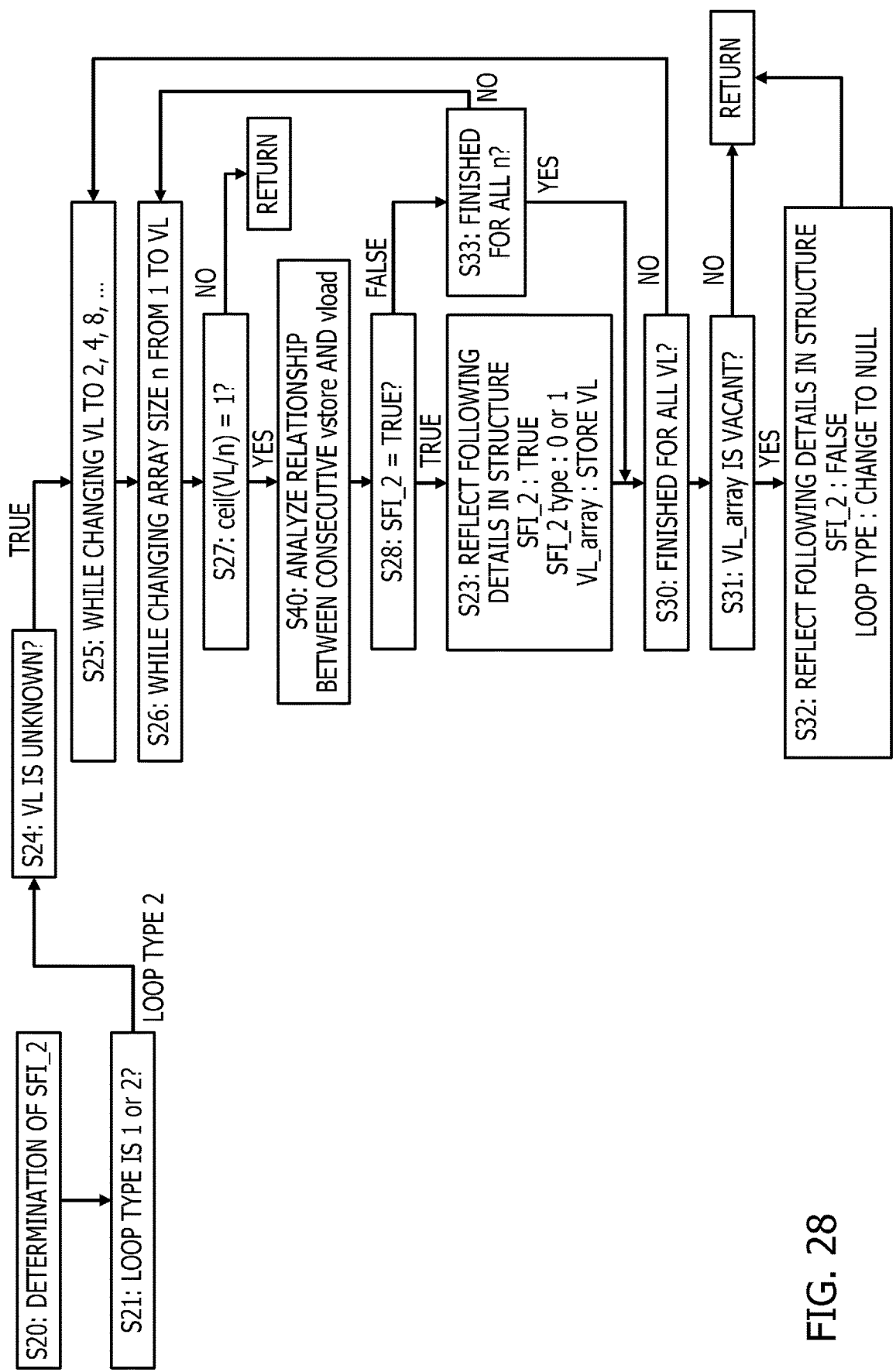

FIG. 27 and FIG. 28 are diagrams illustrating flow charts of the determination processing S20 of SFI_2. The processor that executes the compiler determines whether the loop has the loop type 1 or the loop type 2 (S21), and when the loop has the loop type 1, the processor executes the following processing S40, S22, S23, and S23(2).

Loop Type 1

The processor that executes the compiler analyzes a relationship between consecutive vector store instruction and vector load instruction (S40). In this analysis, the processor determines whether the loop causes SFI_2 (SFI_2=TRUE or FALSE), and whether the load instruction is before the store instruction (SFI_2_type=0) or after the store instruction (SFI_2_type=1). Details thereof are described with reference to FIG. 29 and FIG. 30. When the loop causes SFI_2 (SFI_2=TRUE) (YES in S22), the processor records SFI_2 TRUE and SFI_2_type=0 or 1 into the loop structure, and sets VL_array to NULL (S23). The reason for setting VL_array to NULL is that the vector length VL is a constant, and is not to be checked. When the loop does not cause SFI_2 (SFI_2=FALSE) (NO in S22), the processor records SFI_2=FALSE into the loop structure (S23(2)).

Loop Type 2

In the case of the loop type 2, the processor that executes the compiler determines whether the vector length VL is unknown (S24). When the vector length VL is unknown (FALSE in S24), the processor executes the following processing while incrementing the array size n being a variable from 1 to the vector length VL, that is, for each value of 1 to the vector length VL of the array size n (S26). That is, when the array size n=VL is reached and ceil(VL/n)=1 is true (TRUE in S27), the processor finishes the processing, whereas when the ceil(VL/n)=1 is false (FALSE in S27), the processor analyzes a relationship between consecutive vector store instruction and vector load instruction (S40).

When the loop causes SFI_2 (SFI_2=TRUE) (TRUE in S22), the processor records SFI_2=TRUE and SFI_2_type=0 or 1 into the loop structure, and sets VL array to NULL (S23). Then, the processor finishes the determination processing S20 of SFI_2. When the loop does not cause SFI_2 (SFI_2=FALSE) (FALSE in S22), the processor returns to S26 and increments the array size n when all the array sizes n are not checked (NO in S33). When all the array sizes n are finished (YES in S33), the processor records the fact that the loop does not cause SFI_2 (SFI_2=FALSE) (S23(2)), and finishes the processing. In other words, when the processor has detected SFI_2=TRUE at least once while incrementing the array size n from 1 to VL, the processor determines that the loop may cause SFI_2.

Referring to FIG. 28, when the loop has the loop type 2 and the vector length VL is unknown (TRUE in S24), the processor executes the processing S26 to S30, and S33 while changing the vector length to 2, 4, 8, . . . , that is, for each vector length (power of 2) to be taken (S25). Among the processing S26 to S30, the processing S26, S27, S40, S28, S33 excluding S29 and S30 are the same as those of FIG. 27. In the processing S29, the processor stores SFI_2=TRUE and SFI_2_type=0 or 1 into the loop structure, and stores the current VL into the vector length array VL_array. The processor repeats the above-mentioned processing until determination of all the vector lengths VL is finished (S30). In other words, the processor repeats the processing S26, S27, S40, S28, S29, S33 until SFI_2=TRUE is determined while changing the array size n for each of all the vector lengths VL. In this manner, the processor detects all the vector lengths VL that cause SFI_2, and registers all the detected VLs in the vector length array VL array in the loop structure.

When determination of all the vector lengths VL is finished, and the vector length array VL_array of the loop structure is vacant (YES in S31), the processor records SFI_2=FALSE and the loop type=NULL into the loop structure (S32). In this case, SFI_2 does not occur in all the VLs, and thus the analyzed loop is excluded from the loop to be optimized.

Figure 29:
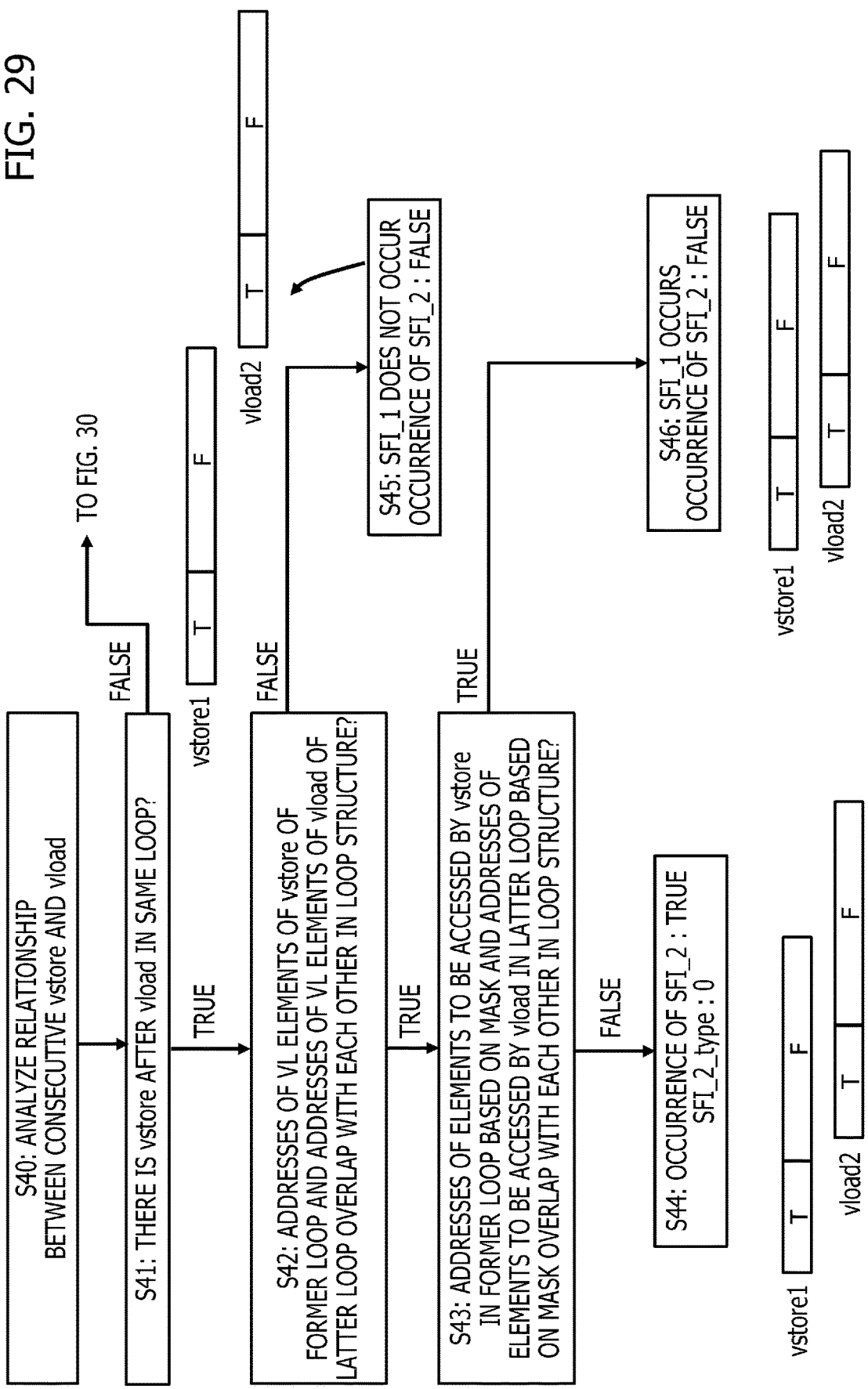
FIG. 29 and FIG. 30 are diagrams illustrating flow charts of the processing S40 of determining a relationship between a vector store instruction and a vector load instruction in the same loop and in proceeding and subsequent loops.
Figure 30:
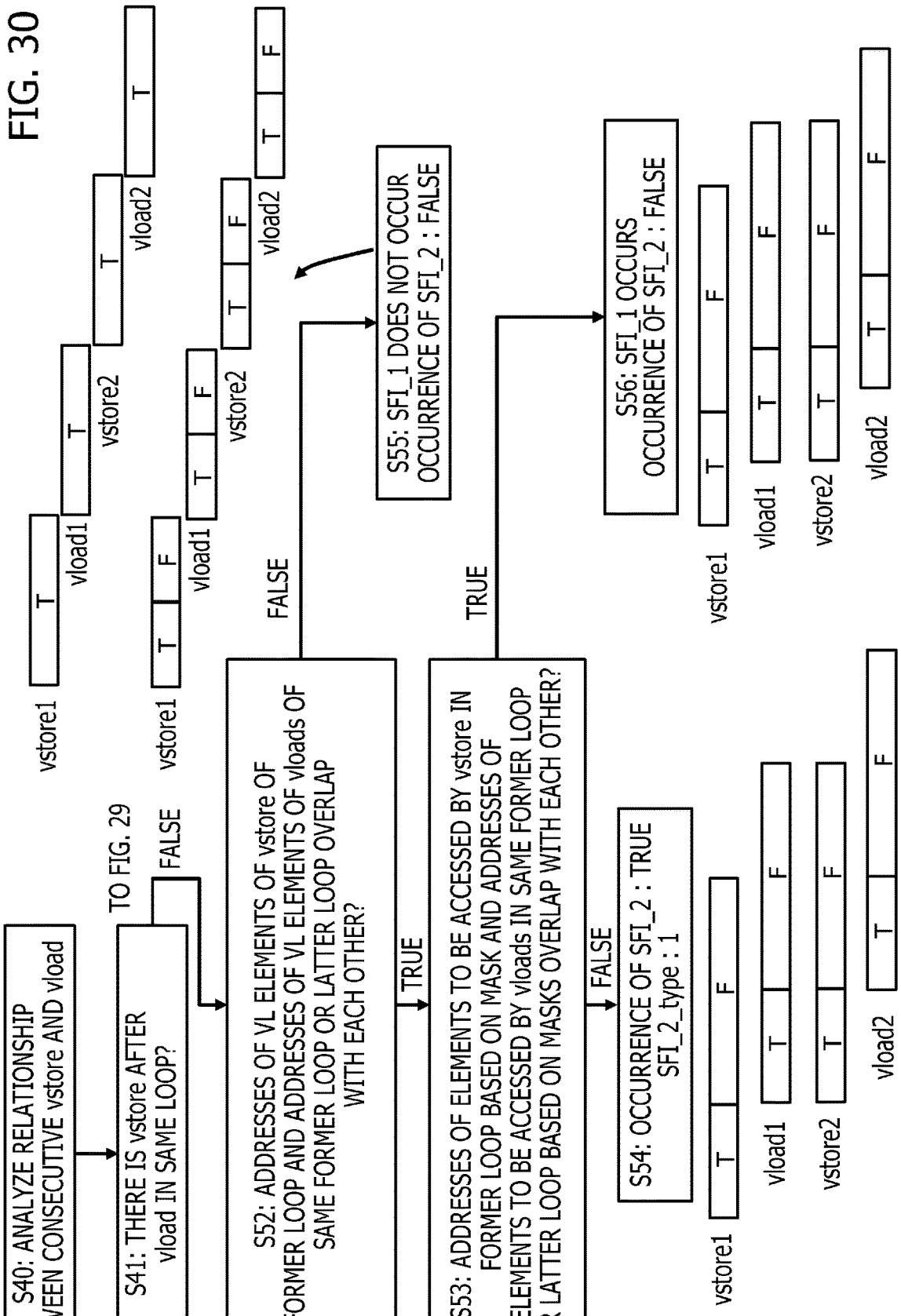

Determination S40 of Relationship Between Vector Store Command and Vector Load Command FIG. 29 and FIG. 30 are diagrams illustrating flow charts of the processing S40 of determining a relationship between a vector store instruction and a vector load instruction in the same loop and in proceeding and subsequent loops. The processor that executes the compiler determines whether there is a store instruction after a load instruction in the same loop (S41). The determination results in true (TRUE in S41), the processor executes the processing S42 to S45. When the determination results in false (FALSE in S41), the processor executes the processing of FIG. 30.

When the determination of S41 results in TRUE, the processor first determines whether the addresses of the number of elements commensurate with a vector length with respect to the first element of a vector store instruction vstore1 of a former loop and the addresses of the vector length elements of a vector load instruction vload2 of a latter loop overlap with each other between loops in loop structure (S42). When the determination S42 results in FALSE, SFI_1 does not occur, and SFI_2 also does not occur. Thus, the processor records the fact that SFI_2 is FALSE into the loop structure (S45). A relationship between the vector store instruction vstore1 in the first iteration and a vector load instruction vload1 in the second iteration is indicated above the block of S45.

When the determination S42 results in TRUE, the processor next determines whether the addresses of elements to be accessed by a vector store instruction in a former loop based on the mask register and the addresses of elements to be accessed by a vector load instruction in a latter loop based on the mask register overlap with each other between loops in loop structure (S43). When the determination S43 results in FALSE, SFI_2 may occur, and thus the processor records the fact that SFI_2 is TRUE and SFI_2_type=0 into the loop structure (S44). When the determination S43 results in TRUE, SFI_1 occurs, and SFI_2 does not occur. Thus, the processor records the fact that SFI_2 is FALSE into the loop structure (S46). A relationship between the vector store instruction vstore1 in the first iteration (the preceding loop) and a vector load instruction vload1 in the second iteration (the subsequent loop) is indicated below the blocks of S44 and S46.

As illustrated in FIG. 30, when the determination of S41 is FALSE, the processor first determines whether the addresses of the vector length elements of a vector store instruction vstore1 of a former loop and the addresses of the vector length elements of vector load instructions vload1 or vload2 of the same former loop or latter loop overlap with each other (S52). That is, the processor determines whether the addresses of the vector length elements overlap with each other between the former vector store instruction vstore1 and the latter vector load instruction vload1 in the same loop. When the determination S52 results in FALSE, SFI_1 does not occur, and SFI_2 also does not occur. Thus, the processor records the fact that SFI_2 is FALSE into the loop structure (S55). A relationship between the former vector store instruction vstore1 and the latter vector load instruction vload1 in the same loop is indicated above the block of S55.

When the determination S52 results in TRUE, the processor next determines whether the addresses of elements to be accessed by a vector store instruction vstore1 in a former loop based on the mask register and the addresses of elements to be accessed by vector load instructions vload1 or vload2 in the same former loop or a latter loop based on the mask registers overlap with each other (S53). That is, the processor determines whether the addresses of elements to be accessed by the former vector store instruction vstore1 based on the mask register and the addresses of elements to be accessed by the latter vector load instruction vload1 based on the mask register overlap with each other in the same loop. When the determination results in FALSE, SFI_2 may occur, and thus the processor records the fact that SFI_2 is TRUE and SFI_2_type=1 into the loop structure (S54). When the determination S53 results in TRUE, SFI_1 occurs, and SFI_2 does not occur. Thus, the processor records the fact that SFI_2 is FALSE into the loop structure (S56). A relationship between the former vector store instruction vstore1 and the latter vector load instruction vload1 in the same loop is indicated below the blocks of S54 and S56.

As described above, the processor executes the optimization processing of the compiler in this embodiment, and generates an assembly code or object code. With this, the processor that executes the compiler can optimize the intermediate code such that the processor that executes an object code can avoid determination of occurrence of SFI_2 in the loop structure. Furthermore, even when the array size n is a variable and the vector length VL is unknown in the loop structure, the processor can optimize the intermediate code such that the processor avoids determination of SFI_2 for the array size n and the vector length VL, which are determined when the processor executes the object code.

When determination of SFI_2 can be avoided, the processor can execute load instructions by out-of-order execution.

When the array size n and the iteration count m of a loop does not match each other, namely, m<n is satisfied, and consecutive addresses are not accessed, and when the array size n and the vector length VL do not have a specific ratio, the processor that executes the compiler can optimize the program so that determination of SFI_2 can be avoided. Also when the vector length VL is a constant or unknown or the array size n is a constant or a variable at the time of compiling, for instance, the processor can optimize the program such that determination of SFI_2 can be avoided in accordance with the array size n and the vector length VL, which are determined when the compiled object code is executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A non-transitory computer readable storage medium that stores therein a compiler program causing a computer to execute optimization processing for an optimization target program, the optimization processing comprising:
the optimization target program including a loop including a vector store instruction and a vector load instruction for an array variable,
unrolling the vector store instruction and the vector load instruction in the loop by an unrolling number of times to generate a plurality of unrolled vector store instructions and a plurality of unrolled vector load instructions, the unrolling number of times including a first unrolling number of times, which is obtained by dividing a vector length by an array size of the array variable and rounding up a remainder, or a second unrolling number of times lower than the first unrolling number of times by one; and
scheduling to move an unrolled vector load instruction among the plurality of unrolled vector load instructions, which is located after a first unrolled vector store instruction that is located at first among the plurality of unrolled vector load instructions, before the first unrolled vector store instruction.

2. The compiler program according to claim 1, wherein, in the loop, the array size of the array variable is a constant and the vector length is a constant, a iteration count of the loop is lower than the array size, a ratio between the iteration count of the loop and the vector length is not a specific ratio that enables unpacking.

3. The compiler program according to claim 2, wherein the loop of the optimization target program corresponds to a secondary store fetch interlock in which memory addresses of vector length elements of a preceding vector store instruction in a plurality of iterations of the loop and memory addresses of the vector length elements of a subsequent vector load instruction in the plurality of iterations of the loop overlap with each other, but memory addresses of elements to be accessed by the preceding vector store instruction and the subsequent vector load instruction based on mask registers do not overlap with each other.

4. The compiler program according to claim 3, wherein, when the loop of the optimization target program includes a vector store instruction after a vector load instruction, the secondary store fetch interlock is a case in which (1) memory addresses of the vector length elements of the preceding vector store instruction in a first iteration of the loop and memory addresses of the vector length elements of the subsequent vector load instruction in a second iteration, which is next to the first iteration, overlap with each other, but (2) memory addresses of elements to be accessed by the preceding vector store instruction in the first iteration based on a mask register and memory addresses of elements to be accessed by the subsequent vector load instruction in the second iteration based on a mask register do not overlap with each other.

5. The compiler program according to claim 3, wherein, when the loop includes a vector load instruction after a vector store instruction, the secondary store fetch interlock is a case in which (1) memory addresses of the vector length elements of the preceding vector store instruction in a first iteration of the loop and memory addresses of the vector length elements of subsequent vector load instruction in the first iteration overlap with each other, but (2) memory addresses of elements to be accessed by the preceding vector store instruction in the first iteration based on a mask register and memory addresses of elements to be accessed by the subsequent vector load instruction in the first iteration based on a mask register do not overlap with each other.

6. The compiler program according to claim 1, wherein
when the loop includes a vector store instruction after a vector load instruction, the number of times of unrolling is the first unrolling number of times, and
when the loop includes a vector load instruction after a vector store instruction, the number of times of unrolling is the second unrolling number of times.

7. The compiler program according to claim 1, wherein
the optimization processing further comprises converting, when an array size of the array variable is a variable and the vector length is a constant or unknown, the loop into case-specific loops each including the vector store instruction and the vector load instruction in the loop, for each of a plurality of cases of the first unrolling number of times or the second unrolling number of times, calculated based on a possible combination of the array size and the vector length, and
the unrolling includes unrolling processing for each of the case-specific loops, and the scheduling includes scheduling processing for each of the case-specific loops.

8. A method of compiling that executes optimization processing for an optimization target program,
the optimization processing comprising:
the optimization target program including a loop including a vector store instruction and a vector load instruction for an array variable,
unrolling the vector store instruction and the vector load instruction in the loop by an unrolling number of times to generate a plurality of unrolled vector store instructions and a plurality of unrolled vector load instructions, the unrolling number of times including a first unrolling number of times, which is obtained by dividing a vector length by an array size of the array variable and rounding up a remainder, or a second unrolling number of times lower than the first unrolling number of times by one; and
scheduling to move an unrolled vector load instruction among the plurality of unrolled vector load instructions, which is located after a first unrolled vector store instruction that is located at first among the plurality of unrolled vector load instructions, before the first unrolled vector store instruction.

9. An information processing device comprising:
a processor;
a memory accessed by the processor,
wherein the processor executes optimization processing for an optimization target program,
the optimization target program including a loop including a vector store instruction and a vector load instruction for an array variable, and
the optimization processing including:
unrolling the vector store instruction and the vector load instruction in the loop by an unrolling number of times to generate a plurality of unrolled vector store instructions and a plurality of unrolled vector load instructions, the unrolling number of times including a first unrolling number of times, which is obtained by dividing a vector length by an array size of the array variable and rounding up a remainder, or a second unrolling number of times lower than the first unrolling number of times by one; and
scheduling to move an unrolled vector load instruction among the plurality of unrolled vector load instructions, which is located after a first unrolled vector store instruction that is located at first among the plurality of unrolled vector load instructions, before the first unrolled vector store instruction.

* * * * *